(12) United States Patent
Kim

(10) Patent No.: US 12,229,409 B2
(45) Date of Patent: Feb. 18, 2025

(54) ELECTRONIC DEVICES TRANSMITTING ENCODED DATA, AND METHODS OF OPERATING THE SAME

(71) Applicant: Samsung Electronics Co., Ltd., Suwon-si (KR)

(72) Inventor: Ho-Youn Kim, Suwon-si (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 18/364,582

(22) Filed: Aug. 3, 2023

(65) Prior Publication Data
US 2024/0248608 A1    Jul. 25, 2024

(30) Foreign Application Priority Data

Jan. 19, 2023 (KR) .................. 10-2023-0008349

(51) Int. Cl.
*G06F 12/00* (2006.01)
*G06F 3/06* (2006.01)

(52) U.S. Cl.
CPC .......... *G06F 3/0613* (2013.01); *G06F 3/0659* (2013.01); *G06F 3/067* (2013.01)

(58) Field of Classification Search
CPC ...... G06F 3/0613; G06F 3/0659; G06F 3/067; G06F 13/1668; G06F 15/7821
See application file for complete search history.

(56) References Cited

U.S. PATENT DOCUMENTS

| | | | |
|---|---|---|---|
| 7,120,673 B2 * | 10/2006 | Kitamura | G06F 3/067 709/213 |
| 8,024,642 B2 | 9/2011 | Lastras-Montano | |
| 10,097,602 B2 | 10/2018 | Tulino et al. | |
| 10,437,769 B2 | 10/2019 | Greenspan | |
| 11,288,406 B1 | 3/2022 | Tran et al. | |
| 2017/0147431 A1 * | 5/2017 | West | G06F 3/0619 |
| 2017/0339242 A1 | 11/2017 | Westphal et al. | |
| 2019/0056990 A1 * | 2/2019 | Suh | G06F 3/068 |
| 2019/0222668 A1 | 7/2019 | Tulino et al. | |
| 2020/0150894 A1 * | 5/2020 | Lee | G11C 11/5671 |
| 2022/0230685 A1 | 7/2022 | Alrod et al. | |
| 2024/0103741 A1 * | 3/2024 | Sforzin | G06F 3/0679 |

FOREIGN PATENT DOCUMENTS

| | | | | |
|---|---|---|---|---|
| JP | 7086449 B1 | 6/2022 | | |
| KR | 102015188 B1 | 8/2019 | | |
| KR | 20230083689 A | * 6/2023 | .......... | G06F 11/1012 |
| TW | 201719671 A | * 6/2017 | .......... | G06F 11/1068 |
| WO | 2020263024 A1 | 12/2020 | | |

* cited by examiner

*Primary Examiner* — Shawn X Gu
*Assistant Examiner* — Mohammad S Hasan
(74) *Attorney, Agent, or Firm* — Myers Bigel, P.A.

(57) ABSTRACT

A method of operating an electronic device which includes a first host device, a second host device, a control logic circuit, and a memory cell array. The method may include distributing target data of the memory cell array into the first and second host devices, where the target data include a first data piece and a second data piece, generating a first request for the first data piece, generating a second request for the second data piece, receiving the first request and the second request during a reference time period, generating encoded data by performing a first exclusive OR (XOR) operation on the first data piece and the second data piece of the target data in the memory cell array, based on the first and second requests, and transmitting the encoded data to the first and second host devices.

20 Claims, 19 Drawing Sheets

FIG. 5

| <XOR Truth Table> | | |
|---|---|---|
| Input A | Input B | Output Q |
| 0 | 0 | 0 |
| 0 | 1 | 1 |
| 1 | 0 | 1 |
| 1 | 1 | 0 |

ELECTRONIC DEVICES TRANSMITTING ENCODED DATA, AND METHODS OF OPERATING THE SAME

CROSS-REFERENCE TO RELATED APPLICATION

This application claims priority under 35 U.S.C. § 119 to Korean Patent Application No. 10-2023-0008349 filed on Jan. 19, 2023, in the Korean Intellectual Property Office, and the entire contents of the above-identified application are incorporated by reference herein.

TECHNICAL FIELD

Aspects of the present disclosure relate to electronic devices, and more particularly, relate to electronic devices that transmit or are configured to transmit encoded data, and method of operating such electronic devices.

BACKGROUND

A memory device may be configured to store data in response to a write request, and may be configured to output data stored in the memory device in response to a read request. A memory device may be classified as a volatile memory device, which loses data stored therein when a power is turned off, such as a dynamic random access memory (DRAM) device or a static RAM (SRAM) device, or the memory device may be classified as a non-volatile memory device, which retains data stored therein even when a power is turned off, such as a flash memory device, a phase-change RAM (PRAM), a magnetic RAM (MRAM), or a resistive RAM (RRAM).

Nowadays, as technology for memory devices continues to improve and the demands (e.g., user demands) increase, the size of or amount of data that are stored in the memory device is increasing. The transmission of a large amount of data may cause excessive consumption of a bandwidth of a communication channel, a decrease in a communication speed, and/or an increase in power consumption. Accordingly, techniques for transmitting a large amount of data efficiently are under study.

SUMMARY

Some embodiments of the present disclosure provide electronic devices that transmit or are configured to transmit encoded data and method of operating the electronic devices.

According to some embodiments, a method of operating an electronic device which includes a first host device, a second host device, a control logic circuit, and a memory cell array includes distributing, by the control logic circuit, target data of the memory cell array into the first and second host devices, wherein the target data include a first data piece and a second data piece, generating, by the first host device, a first request for the first data piece, generating, by the second host device, a second request for the second data piece, receiving, by the control logic circuit, the first request and the second request during a reference time period, generating, by the control logic circuit, encoded data by performing a first exclusive OR (XOR) operation on the first data piece and the second data piece of the target data in the memory cell array, based on the first and second requests, and transmitting, by the control logic circuit, the encoded data to the first and second host devices.

According to some embodiments, a method of operating an electronic device which includes a first host device, a second host device, a third host device, a control logic circuit, and a memory cell array includes distributing, by the control logic circuit, target data of the memory cell array into the first to third host devices, wherein the target data include a first data piece, a second data piece, and a third data piece, generating, by the first host device, a first request for the first data piece, generating, by the second host device, a second request for the second data piece, generating, by the third host device, a third request for the third data piece, receiving, by the control logic circuit, the first, second, and third requests during a reference time period, generating, by the control logic circuit, encoded data by performing a first exclusive OR (XOR) operation on the first data piece, the second data piece, and the third data piece of the target data in the memory cell array, based on the first, second, and third requests, and transmitting, by the control logic circuit, the encoded data to the first, second, and third host devices.

According to some embodiments, an electronic device includes a memory cell array that stores target data including a first data piece and a second data piece, a first host device that stores the second data piece and to generate a first request for the first data piece, a second host device that stores the first data piece and to generate a second request for the second data piece, and a control logic circuit. The control logic circuit distributes the target data of the memory cell array into the first and second host devices, receives the first request and the second request during a reference time period, generates encoded data by performing an exclusive OR (XOR) operation on the first data piece and the second data piece of the target data in the memory cell array, based on the first request and second request, and transmits the encoded data to the first and second host devices.

BRIEF DESCRIPTION OF THE FIGURES

The above and other objects and features of the present disclosure will become apparent by describing in detail embodiments thereof with reference to the accompanying drawings.

FIG. 5 is a table describing an input and an output of a logical operation according to some embodiments of the present disclosure.

DETAILED DESCRIPTION

Below, some embodiments of the present disclosure will be described in detail and with sufficient clarity to permit one skilled in the art to carry out easily one or more embodiments of the present disclosure.

Figure 1:
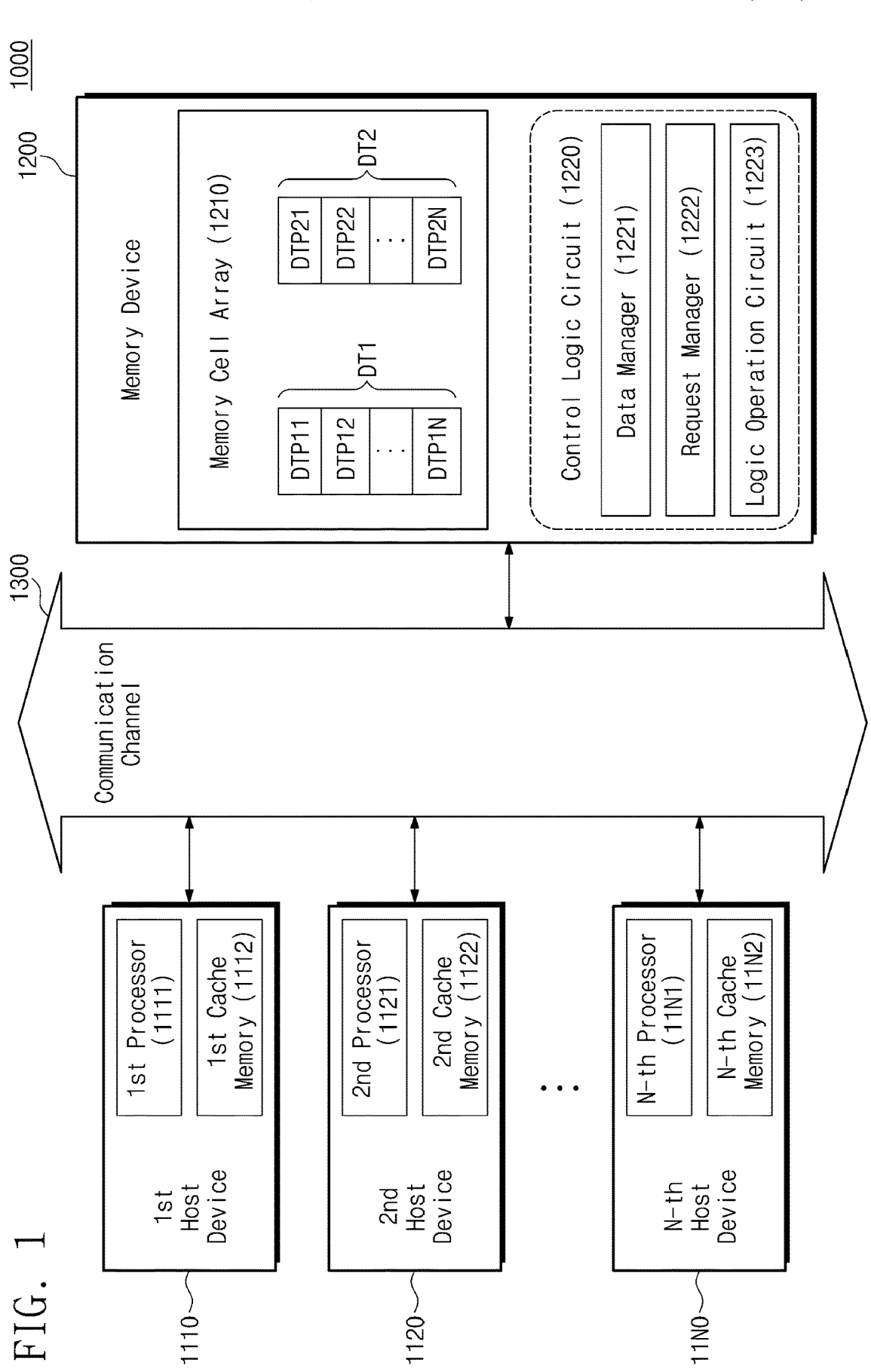
FIG. 1 is a block diagram of an electronic device according to some embodiments of the present disclosure.

FIG. 1 is a block diagram of an electronic device according to some embodiments of the present disclosure. Referring to FIG. 1, an electronic device 1000 may include a plurality of host devices 1110 to 11N0, a memory device 1200, and a communication channel 1300.

The electronic device 1000 may perform various operations through the plurality of host devices 1110 to 11N0 based on data stored in the memory device 1200. For example, the electronic device 1000 may be a computing system, which may be configured to process a variety of information, such as a personal computer (PC), a notebook, a laptop, a server, a workstation, a tablet PC, a smartphone, a digital camera, a black box, a data server, or a data center.

The plurality of host devices 1110 to 11N0 may control an overall operation of the electronic device 1000. For example, the plurality of host devices 1110 to 11N0 may store data in the memory device 1200 and/or may read data stored in the memory device 1200. The plurality of host devices 1110 to 11N0 may perform various operations based on the data read from the memory device 1200.

The plurality of host devices 1110 to 11N0 may be referred to as "first to N-th host devices 1110 to 11N0". Herein, "N" is an arbitrary natural number.

The first host device 1110 may include a first processor 1111 and a first cache memory 1112. The first processor 1111 may be implemented with a central processing unit (CPU), a graphics processing unit (GPU), a neural processing unit (NPU), etc. The first cache memory 1112 may be a memory dedicated for the first processor 1111.

The first processor 1111 may perform an operation based on data buffered in the first cache memory 1112. When data that are needed and/or used for an operation are absent from the first cache memory 1112, the first processor 1111 may request data from the memory device 1200 through the communication channel 1300. The first cache memory 1112 may receive data from the memory device 1200 through the communication channel 1300. The first processor 1111 may restore needed and/or used data based on the data buffered in the first cache memory 1112 and the data received from the memory device 1200.

In some embodiments, the first processor 1111 may be a processor that is specialized for artificial intelligence (AI) or machine learning. For example, the first processor 1111 may be an accelerator node that is implemented with an NPU or a GPU. The first processor 1111 may perform a neural network operation based on neural network data (e.g., image data, weight data, kernel data, or a feature map) that are received from the memory device 1200 and are buffered in the first cache memory 1112. This will be described in greater detail with reference to FIG. 11.

A second host device 1120 may include a second processor 1121 and a second cache memory 1122. The second host device 1120 may operate in a similar manner to the first host device 1110. Likewise, the N-th host device 11N0 may include an N-th processor 11N1 and an N-th cache memory 11N2. The N-th host device 11N0 may operate in a similar manner to the first host device 1110.

The memory device 1200 may communicate with the plurality of host devices 1110 to 11N0 through the communication channel 1300. The memory device 1200 may store data needed and/or used for operations of the plurality of host devices 1110 to 11N0. The memory device 1200 may store data received from the plurality of host devices 1110 to 11N0 and/or may provide the stored data to the plurality of host devices 1110 to 11N0.

For example, the memory device 1200 may be a volatile memory device, which loses data stored therein when a power is turned off, such as a dynamic random access memory (DRAM) device or a static random access memory (SRAM) device.

In some embodiments, the memory device 1200 may be a volatile memory device that is specialized for the AI or machine learning. For example, the plurality of host devices 1110 to 11N0 may support the neural network operation discussed above. The memory device 1200 may store data that are used in the neural network operation.

However, the present disclosure is not limited thereto. For example, the memory device 1200 may be implemented with a non-volatile memory device, which retains data stored therein even when a power is turned off, such as a phase-change RAM (PRAM), a magnetic RAM (MRAM), or a resistive RAM (RRAM).

In some embodiments, the memory device 1200 may be a shared memory device for the plurality of host devices 1110 to 11N0. The data stored in the memory device 1200 may be shared by the plurality of host devices 1110 to 11N0.

The memory device 1200 may include a memory cell array 1210 and a control logic circuit 1220.

The memory cell array 1210 may store data needed and/or used for operations of the plurality of host devices 1110 to 11N0. The memory cell array 1210 may include a plurality of memory cells. The plurality of memory cells of the memory cell array 1210 may store first data DT1 and second data DT2. The first data DT1 may include first to N-th data pieces DTP11 to DTP1N. The second data DT2 may include first to N-th data pieces DTP21 to DTP2N.

The control logic circuit 1220 may manage data stored in the memory cell array 1210. For example, the control logic circuit 1220 may distribute the first data DT1 and the second data DT2 into the plurality of host devices 1110 to 11N0, may receive requests from the plurality of host devices 1110 to 11N0, may generate encoded data by performing a logical operation on data pieces depending on the received requests, and/or may provide the encoded data to the plurality of host devices 1110 to 11N0.

The control logic circuit 1220 may include a data manager 1221, a request manager 1222, and a logic operation circuit 1223.

The data manager 1221 may load the first data DT1 from the memory cell array 1210. The data manager 1221 may distribute the first data DT1 thus loaded into the plurality of host devices 1110 to 11N0. For example, the first host device 1110 may store the second to N-th data pieces DTP12 to DTP1N. The second host device 1120 may store the first data piece DTP11 and the third to N-th data pieces DTP13 to DTP1N. The N-th host device 11N0 may store the first to (N−1)-th data pieces DTP11 to DTP1N-1.

However, the present disclosure is not limited thereto. For example, depending on a distribution policy or rule of the data manager 1221, the first to N-th data pieces DTP11 to DTP1N of the first data DT1 may be distributed into the plurality of host devices 1110 to 11N0 in various manners.

The request manager 1222 may receive requests from the plurality of host devices 1110 to 11N0 during a reference time period. The reference time period may indicate a range of a time period for collecting requests for data pieces.

For example, the request manager 1222 may receive a first request for the first data piece DTP11 from the first host device 1110 during the reference time period. As in the above description, the request manager 1222 may receive second to N-th requests for the second to N-th data pieces DTP12 to DTP1N from the second to N-th host devices 1120 to 11N0 during the reference time period.

Under control of the request manager 1222, the logic operation circuit 1223 may load requested data pieces from the memory cell array 1210, may generate encoded data by performing a logical operation on the loaded data pieces, and may transmit the encoded data to the plurality of host devices 1110 to 11N0.

For example, the request manager 1222 may receive the first to N-th requests for the first to N-th data pieces DTP11 to DTP1N. Under control of the request manager 1222, the logic operation circuit 1223 may load the first to N-th data pieces DTP11 to DTP1N from the memory cell array 1210, may generate encoded data by performing a logical operation on the first to N-th data pieces DTP11 to DTP1N thus loaded, and may transmit the encoded data to the plurality of host devices 1110 to 11N0. The plurality of host devices 1110 to 11N0 may restore a needed and/or used data piece based on the encoded data.

The logic operation circuit 1223 may support an exclusive OR (XOR) operation. The XOR operation will be described in greater detail with reference to FIG. 5.

In some embodiments, data pieces may have the same size. For example, the first data DT1 may include the first to N-th data pieces DTP11 to DTP1N. The first to N-th data pieces DTP11 to DTP1N may have the same size.

In some embodiments, the size of encoded data may be smaller than the size of original data. For example, the original data may be the first data DT1 stored in the memory cell array 1210. The first data DT1 may include the first to N-th data pieces DTP11 to DTP1N. The encoded data may be generated by a logical operation of the first to N-th data pieces DTP11 to DTP1N. The size of the encoded data may be smaller than the size of the first data DT1 as much as N times.

The communication channel 1300 may provide an interface between the plurality of host devices 1110 to 11N0 and the memory device 1200. The communication channel 1300 may support data communication from the memory device 1200 to the plurality of host devices 1110 to 11N0. For example, the first data DT1 or at least some of the first to N-th data pieces DTP11 to DTP1N may be transmitted through the communication channel 1300.

The communication channel 1300 may support the transmission of requests from the plurality of host devices 1110 to 11N0 to the memory device 1200. For example, the requests for the first to N-th data pieces DTP11 to DTP1N may be transmitted through the communication channel 1300.

The communication channel 1300 may be implemented with a wired communication channel or a wireless communication channel. In some embodiments, the communication channel 1300 may have a limited bandwidth. The bandwidth of the communication channel 1300 may be consumed by data or requests that are transmitted.

Figure 2:
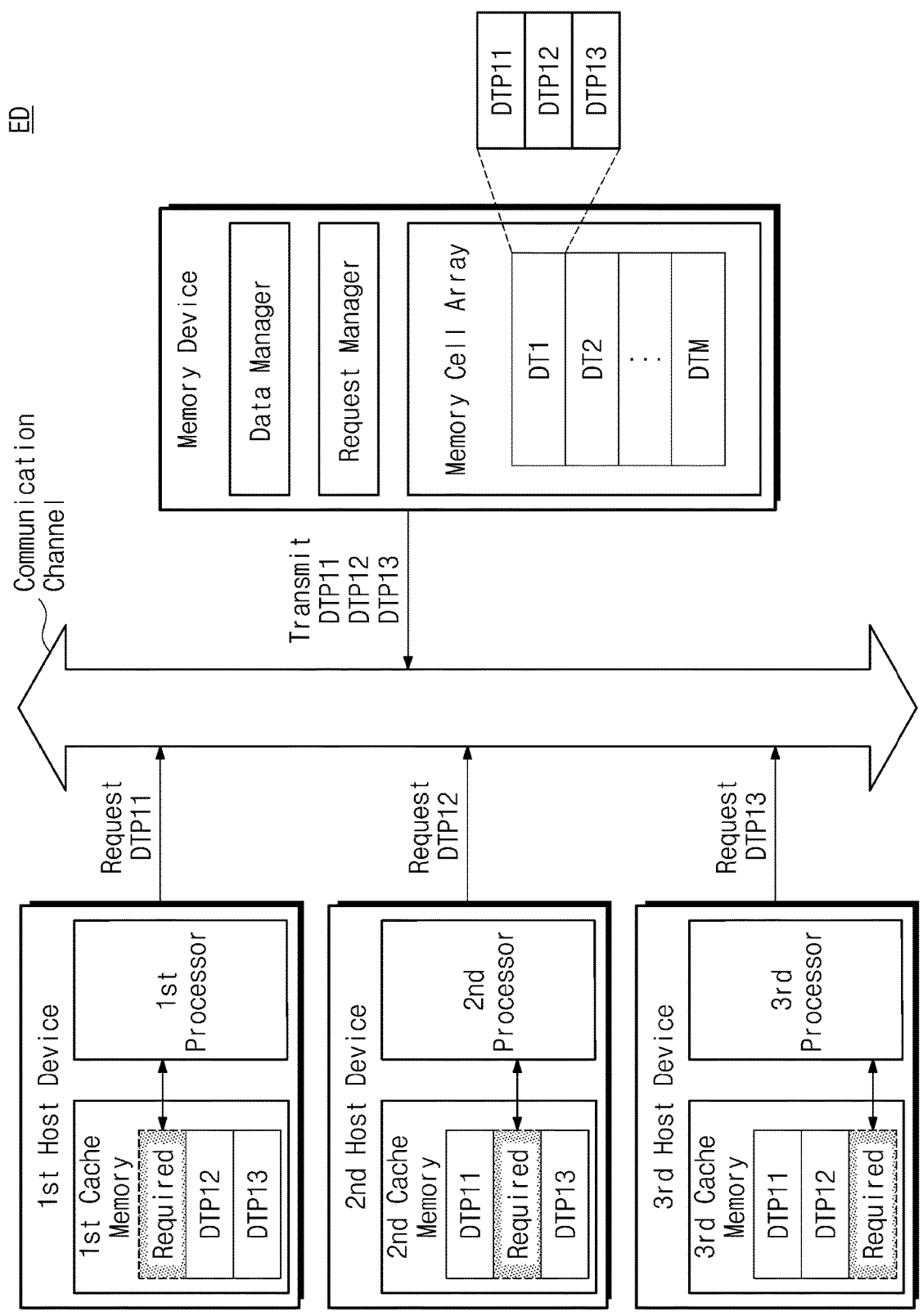
FIG. 2 is a block diagram describing a conventional electronic device.

FIG. 2 is a block diagram describing a conventional electronic device. A conventional electronic device ED will be described with reference to FIG. 2. For better understanding of the present disclosure, the conventional electronic device ED may include technical features or operations that documents of the information disclosure statement do not disclose.

The conventional electronic device ED may include a first host device, a second host device, a third host device, a memory device, and a communication channel. The communication channel may provide an interface between the first to third host devices and the memory device.

The memory device may include a data manager, a request manager, and a memory cell array. The memory cell array may include first to M-th data DT1 to DTM. Herein, "M" is an arbitrary natural number. The first data DT1 may include first to third data pieces DTP11 to DTP13. The data manager may distribute the first data DT1 into the first to third host devices.

The first host device may include a first cache memory and a first processor. The first cache memory may store the second data piece DTP12 and the third data piece DTP13. The first cache memory may not buffer the first data piece DTP11. The first processor may determine that the first data piece DTP11 is required, with reference to the first cache memory and may request the first data piece DTP11 from the memory device through the communication channel.

The second host device may include a second cache memory and a second processor. The second cache memory may store the first data piece DTP11 and the third data piece DTP13. The second cache memory may not buffer the second data piece DTP12. The second processor may determine that the second data piece DTP12 is required, with reference to the second cache memory and may request the second data piece DTP12 from the memory device through the communication channel.

The third host device may include a third cache memory and a third processor. The third cache memory may store the first data piece DTP11 and the second data piece DTP12. The third cache memory may not buffer the third data piece DTP13. The third processor may determine that the third data piece DTP13 is required, with reference to the third cache memory and may request the third data piece DTP13 from the memory device through the communication channel.

In response to that the first data piece DTP11, the second data piece DTP12, and the third data piece DTP13 are requested during the reference time period, the request manager may load the first to third data pieces DTP11 to DTP13 of the memory cell array. The request manager may transmit the first to third data pieces DTP11 to DTP13 to the first to third host devices through the communication channel.

As all the first to third data pieces DTP11 to DTP13 are transmitted through the communication channel in an original form, the bandwidth of the communication channel may be excessively consumed. A technique for reducing the size of data to be transmitted may be required to reduce the consumption of the bandwidth, to improve a communication speed of data, and to reduce power consumption.

Figure 3:
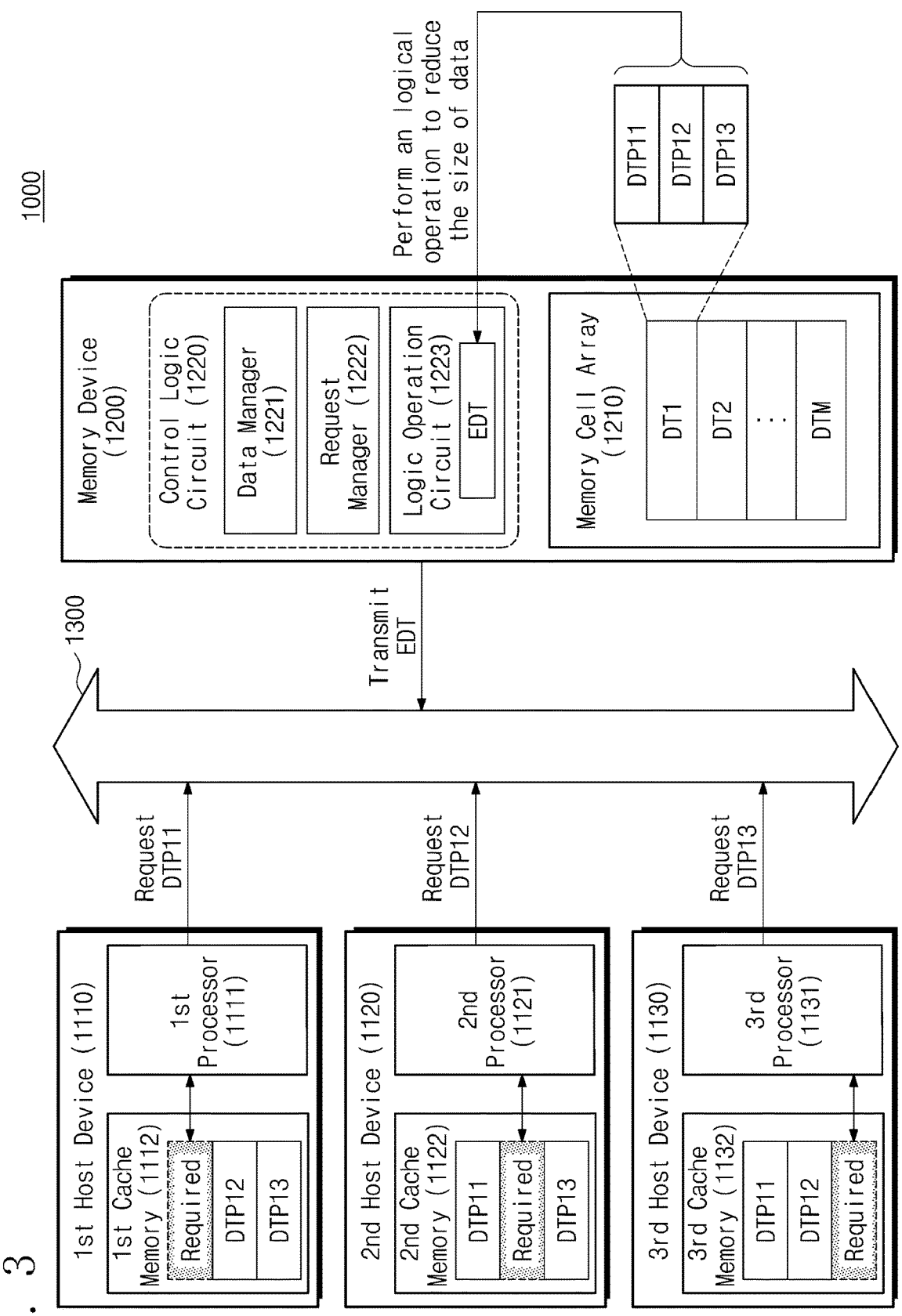
FIG. 3 is a block diagram illustrating an electronic device according to some embodiments of the present disclosure.

FIG. 3 is a block diagram illustrating an electronic device according to an embodiment of the present disclosure. Referring to FIG. 3, the electronic device 1000 may include the first host device 1110, the second host device 1120, a third host device 1130, the memory device 1200, and the communication channel 1300. The communication channel 1300 may provide an interface between the first to third host devices 1110 to 1130 and the memory device 1200.

The memory device 1200 may include the memory cell array 1210 and the control logic circuit 1220. The memory cell array 1210 may include the first to M-th data DT1 to DTM. The first data DT1 may include the first to third data pieces DTP11 to DTP13. The first data DT1 may be referred to as "target data". The target data may indicate data targeted for a distribution operation or a transmission operation by the memory device 1200.

The control logic circuit 1220 may include the data manager 1221, the request manager 1222, and the logic operation circuit 1223. The data manager 1221 may distribute the first data DT1 of the memory cell array 1210 into the first to third host devices 1110, 1120, and 1130.

The first host device 1110 may include the first processor 1111 and the first cache memory 1112. The first cache memory 1112 may store the second data piece DTP12 and the third data piece DTP13. The first cache memory 1112 may not buffer the first data piece DTP11. The first processor 1111 may determine that the first data piece DTP11 is required, with reference to the first cache memory 1112, and may request the first data piece DTP11 from the memory device 1200 through the communication channel 1300.

The second host device 1120 may include the second processor 1121 and the second cache memory 1122. The second cache memory 1122 may store the first data piece DTP11 and the third data piece DTP13. The second cache memory 1122 may not buffer the second data piece DTP12. The second processor 1121 may determine that the second data piece DTP12 is required, with reference to the second cache memory 1122, and may request the second data piece DTP12 from the memory device 1200 through the communication channel 1300.

The third host device 1130 may include a third processor 1131 and a third cache memory 1132. The third cache memory 1132 may store the first data piece DTP11 and the second data piece DTP12. The third cache memory 1132 may not buffer the third data piece DTP13. The third processor 1131 may determine that the third data piece DTP13 is required, with reference to the third cache memory 1132, and may request the third data piece DTP13 from the memory device 1200 through the communication channel 1300.

In response to that the first data piece DTP11, the second data piece DTP12, and the third data piece DTP13 are requested during the reference time period, the request manager 1222 may control the logic operation circuit 1223 such that a logical operation is performed on the first to third data pieces DTP11, DTP12, and DTP13.

Under control of the request manager 1222, the logic operation circuit 1223 may load the first data DT1 from the memory cell array 1210, may generate encoded data EDT by performing the logical operation on the first to third data pieces DTP11, DTP12, and DTP13 of the first data DT1, and may transmit the encoded data EDT to the first to third host devices 1110 to 1130 through the communication channel 1300.

The first host device 1110 may restore the first data piece DTP11 based on a logical operation on the encoded data EDT, the second data piece DTP12, and the third data piece DTP13. The second host device 1120 may restore the second data piece DTP12 based on a logical operation on the encoded data EDT, the first data piece DTP11, and the third data piece DTP13. The third host device 1130 may restore the third data piece DTP13 based on a logical operation on the encoded data EDT, the first data piece DTP11, and the second data piece DTP12.

In some embodiments, the logic operation circuit 1223 may perform the logical operation to reduce the size of data. The size of the encoded data EDT generated by the logical operation may be smaller than the size of original data (i.e., the size of the first data DT1). For example, the logic operation circuit 1223 may generate intermediate data by performing a XOR operation on the first data piece DTP11 and the second data piece DTP12 and may generate the encoded data EDT by performing the XOR operation on the intermediate data and the third data piece DTP13. The size of the encoded data EDT may be smaller than the size of the first data DT1 as much as three times (e.g., may be approximately equal in size to the first data piece DTP11, second data piece DTP12, or third data piece DTP13). An encoding operation and a decoding operation that are based on the XOR operation will be described in detail with reference to FIG. 4.

For better understanding of the present disclosure, an example in which the first data DT1 include the first to third data pieces DTP11 to DTP13 is illustrated, but the present disclosure is not limited thereto. The first data DT1 may be implemented to include data pieces, the number of which may be "2" or more than "3", and a ratio at which the size of the encoded data decreases relative to the original data through performance the logical operation may increase or decrease.

As described above, according to some embodiments of the present disclosure, an electronic device may generate encoded data by performing a logical operation of data pieces, and the size of the encoded data may be smaller than the size of original data. The electronic device may transmit the encoded data with a small size through a communication channel, instead of transmitting (e.g., directly transmitting) the original data through the communication channel. As the size of data transmitted through the communication channel decreases, the consumption of the bandwidth of the communication channel may be reduced, and power consumption may be reduced.

Figure 4:
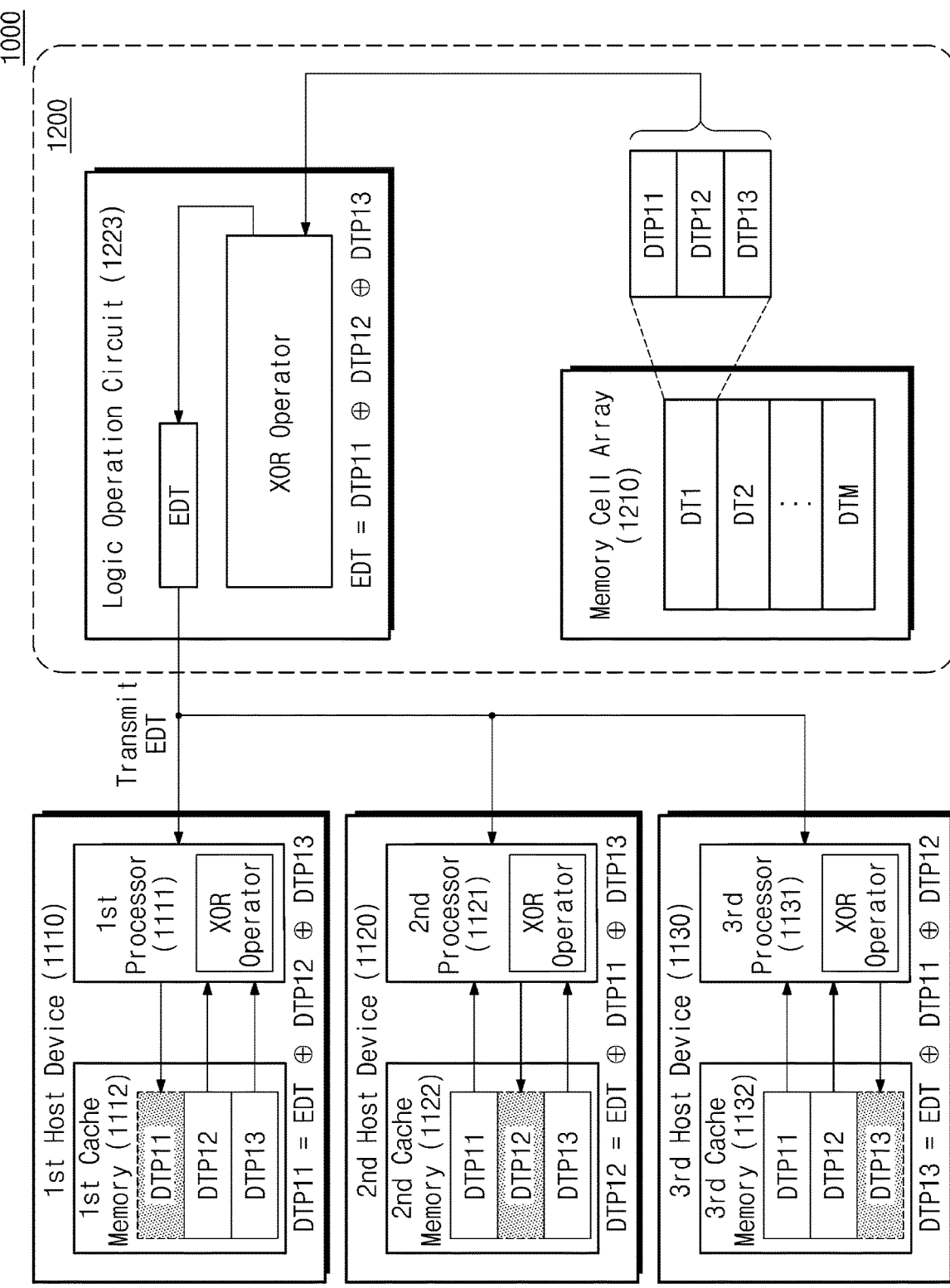
FIG. 4 is a diagram describing a logical operation of an electronic device depending to some embodiments of the present disclosure.

FIG. 4 is a diagram describing a logical operation of an electronic device depending to some embodiments of the present disclosure. Referring to FIG. 4, the electronic device 1000 may include the first host device 1110, the second host device 1120, the third host device 1130, and the memory device 1200. The first host device 1110 may include the first processor 1111 and the first cache memory 1112. The second host device 1120 may include the second processor 1121 and the second cache memory 1122. The third host device 1130 may include the third processor 1131 and the third cache memory 1132. The memory device 1200 may include the memory cell array 1210 and the logic operation circuit 1223.

The memory cell array 1210 may store the first to M-th data DT1 to DTM. The first data DT1 may include the first data piece DTP11, the second data piece DTP12, and the third data piece DTP13.

The first cache memory 1112 may store the second data piece DTP12 and the third data piece DTP13. The first processor 1111 may request the first data piece DTP11 from the memory device 1200, with reference to the first cache memory 1112.

The second cache memory 1122 may store the first data piece DTP11 and the third data piece DTP13. The second processor 1121 may request the second data piece DTP12 from the memory device 1200, with reference to the second cache memory 1122.

The third cache memory 1132 may store the first data piece DTP11 and the second data piece DTP12. The third processor 1131 may request the third data piece DTP13 from the memory device 1200, with reference to the third cache memory 1132.

The logic operation circuit 1223 may load the first data DT1 from the memory cell array 1210 based on that the first to third data pieces DTP11 to DTP13 are requested or have been requested during the reference time period. The logic operation circuit 1223 may include an XOR operator. The XOR operator of the logic operation circuit 1223 may generate the encoded data EDT by performing the XOR operation on the first to third data pieces DTP11 to DTP13 of the first data DT1. One way to obtain the encoded data EDT will be described with reference to Equation 1 below.

$$EDT = DTP11 \oplus DTP12 \oplus DTP13 \qquad \text{[Equation 1]}$$

Equation 1 shows an operation for obtaining the encoded data EDT. In Equation 1 above, EDT represents encoded data, DTP11 represents a first data piece, DTP12 represents a second data piece, and DTP13 represents a third data piece. According to Equation 1 above, intermediate data may be obtained by performing the XOR operation ($\oplus$) on the first data piece DTP11 and the second data piece DTP12, and encoded data may be obtained by performing the XOR operation on the intermediate data and the third data piece DTP13. An operation of obtaining encoded data will be described in detail with reference to FIG. 6A.

The logic operation circuit 1223 may transmit the encoded data EDT to the first to third host devices 1110 to 1130.

The first processor 1111 may receive the encoded data EDT from the logic operation circuit 1223. The first processor 1111 may load the second data piece DTP12 and the third data piece DTP13 from the first cache memory 1112. The first processor 1111 may include an XOR operator. The XOR operator of the first processor 1111 may restore (e.g., decode) the first data piece DTP11 by performing the XOR operation on the encoded data EDT, the second data piece DTP12, and the third data piece DTP13. The first processor 1111 may perform a computation based on the restored first data piece DTP11 or may store the restored first data piece DTP11 in the first cache memory 1112. A way to obtain the first data piece DTP11 will be described with reference to Equation 2 below.

$$DTP11 = EDT \oplus DTP12 \oplus DTP13 \qquad \text{[Equation 2]}$$

Equation 2 shows an operation for obtaining the first data piece DTP11. In Equation 2 above, DTP11 represents a first data piece, EDT represents encoded data, DTP12 represents a second data piece, and DTP13 represents a third data piece. According to Equation 2 above, intermediate data may be obtained by performing the XOR operation on the encoded data and the second data piece, and the first data piece may be obtained by performing the XOR operation on the intermediate data and the third data piece. An operation of obtaining the first data piece will be described in greater detail with reference to FIG. 6B.

The second processor 1121 may receive the encoded data EDT from the logic operation circuit 1223. The second processor 1121 may load the first data piece DTP11 and the third data piece DTP13 from the second cache memory 1122. The second processor 1121 may include an XOR operator. The XOR operator of the second processor 1121 may restore (e.g., decode) the second data piece DTP12 by performing the XOR operation on the encoded data EDT, the first data piece DTP11, and the third data piece DTP13. The second processor 1121 may perform a computation based on the restored second data piece DTP12 or may store the restored second data piece DTP12 in the second cache memory 1122. A way to obtain the second data piece DTP12 will be described with reference to Equation 3 below.

$$DTP12 = EDT \oplus DTP11 \oplus DTP13 \qquad \text{[Equation 3]}$$

Equation 3 shows an operation for obtaining the second data piece DTP12. In Equation 3 above, DTP12 represents a second data piece, EDT represents encoded data, DTP11 represents a first data piece, and DTP13 represents a third data piece. According to Equation 3 above, intermediate data may be obtained by performing the XOR operation on the encoded data and the first data piece, and the second data piece may be obtained by performing the XOR operation on the intermediate data and the third data piece. An operation of obtaining the second data piece will be described in greater detail with reference to FIG. 6C.

The third processor 1131 may receive the encoded data EDT from the logic operation circuit 1223. The third processor 1131 may load the first data piece DTP11 and the second data piece DTP12 from the third cache memory 1132. The third processor 1131 may include an XOR operator. The XOR operator of the third processor 1131 may restore (e.g., decode) the third data piece DTP13 by performing the XOR operation on the encoded data EDT, the first data piece DTP11, and the second data piece DTP12. The third processor 1131 may perform a computation based on the restored third data piece DTP13 or may store the restored third data piece DTP13 in the third cache memory 1132. A way to obtain the third data piece DTP13 will be described with reference to Equation 4 below.

$$DTP13 = EDT \oplus DTP11 \oplus DTP12 \qquad \text{[Equation 4]}$$

Equation 4 shows an operation for obtaining the third data piece DTP13. In Equation 4 above, DTP13 represents a third data piece, EDT represents encoded data, DTP11 represents a first data piece, and DTP12 represents a second data piece. According to Equation 4 above, intermediate data may be obtained by performing the XOR operation on the encoded data and the first data piece, and the third data piece may be obtained by performing the XOR operation on the intermediate data and the second data piece. An operation of obtaining the third data piece will be described in greater detail with reference to FIG. 6D.

FIG. 5 is a table describing an input and an output of a logical operation according to some embodiments of the present disclosure. Referring to FIG. 5, a truth table of an XOR operation is illustrated. The truth table describes an output voltage to arbitrary input values. In detail, the truth table shows output "Q" obtained by the XOR operation of input "A" and input "B".

When a value of input "A" is "0" and a value of input "B" is "0", a value of output "Q" of the XOR operation is "0".

When a value of input "A" is "0" and a value of input "B" is "1", a value of output "Q" of the XOR operation is "1".

When a value of input "A" is "1" and a value of input "B" is "0", a value of output "Q" of the XOR operation is "1".

When a value of input "A" is "1" and a value of input "B" is "1", a value of output "Q" of the XOR operation is "0".

The XOR operation may satisfy a commutative law. This characteristic may be expressed by Equation 5 below.

$$A \oplus B = B \oplus A \quad \text{[Equation 5]}$$

Equation 5 shows that the XOR operation satisfies the commutative law. In Equation 5 above, "A" represents an arbitrary input, and "B" represents an arbitrary input. A result of the XOR operation of "A" and "B" is equal to a result of the XOR operation of "B" and "A". Likewise, referring to the XOR truth table of FIG. 5, a value of output "Q" is irrelevant to the order of input "A" and input "B".

The XOR operation may satisfy the characteristic that an inverse element of an element is itself. This characteristic may be drawn by Equation 6 below.

$$A \oplus B \oplus B = A \oplus 0 = A \quad \text{[Equation 6]}$$

Equation 6 shows that another element (e.g., "A") is capable of being restored based on the characteristic that an inverse element of an element (e.g., "B") is itself. In Equation 6 above, "A" represents an arbitrary input, and "B" represents an arbitrary input. The XOR operation of "B" and "B" may be first performed by applying the commutative law in the XOR operation of "A", "B", and "B". A result of the XOR operation of "B" and "B" is "0". Afterwards, the XOR operation of "A" and "0" may be performed. A result of the XOR operation of "A" and "0" is "A".

FIGS. 6A to 6D are diagrams describing logical operations according to some embodiments of the present disclosure.

Figure 6A:
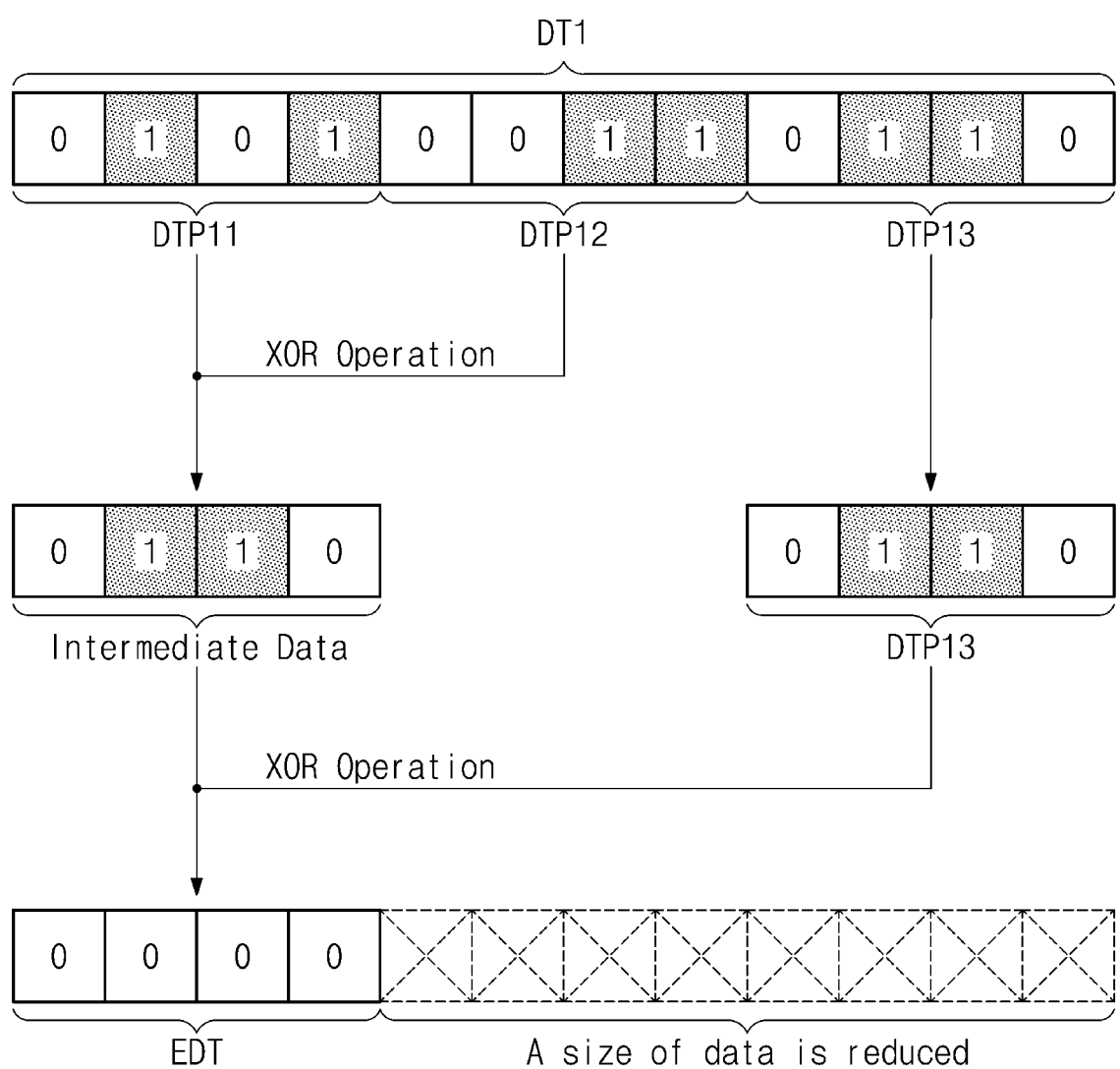
FIGS. 6A to 6D are diagrams describing logical operations according to some embodiments of the present disclosure.

FIG. 6A shows a method of obtaining the encoded data EDT based on the XOR operation of the first data piece DTP11, the second data piece DTP12, and the third data piece DTP13.

Referring to FIGS. 4 and 6A, the logic operation circuit 1223 may load the first data DT1 from the memory cell array 1210. The first data DT1 may include a series of bits being "010100110110", which is merely an illustrative example. The first data DT1 may be a group of the first data piece DTP11, the second data piece DTP12, and the third data piece DTP13. The first data piece DTP11 may include a series of bits being "0101" (e.g., the first four bits of DT1). The second data piece DTP12 may include a series of bits being "0011" (e.g., the next four bits of DT1). The third data piece DTP13 may include a series of bits being "0110" (e.g., the final four bits of DT1).

The XOR operator of the logic operation circuit 1223 may generate the encoded data EDT by performing the XOR operation on the first data piece DTP11, the second data piece DTP12, and the third data piece DTP13 with reference to Equation 1 above. The XOR operation of the first to third data pieces DTP11, DTP12, and DTP13 may include a first XOR operation for obtaining intermediate data based on the first data piece DTP11 and the second data piece DTP12 (e.g., DTP11⊕DTP12), and a second XOR operation for obtaining the encoded data EDT based on the intermediate data and the third data piece DTP13.

The XOR operator of the logic operation circuit 1223 may generate the intermediate data by performing the first XOR operation on the first data piece DTP11 and the second data piece DTP12. The first XOR operation may be performed in units of bit. The intermediate data may include a series of bits being "0110".

Afterwards, the XOR operator of the logic operation circuit 1223 may generate the encoded data EDT by performing the XOR operation on the intermediate data and the third data piece DTP13. The second XOR operation may be performed in units of bit. The encoded data EDT may include a series of bits being "0000".

The size of the encoded data EDT may be smaller than the size of original data. For example, the original data may be the first data DT1. The first data DT1 may include 12 bits. The encoded data EDT may include 4 bits. As the encoded data EDT are generated by performing the XOR operation on data pieces of the first data DT1, the size of data may be reduced. As there are transmitted the encoded data EDT instead of the first data DT1, consumption of the bandwidth of the communication channel 1300 may be reduced.

In some embodiments, the XOR operation may include a series of XOR bit operations (or bitwise XOR operations) for a series of first bits and a series of second bits. A bitwise XOR operation or XOR bit operation may be an operation that takes two bit patterns of equal length (here, the first bits and the second bits) and performs the logical exclusive OR operation on each pair of corresponding bits (e.g., a first bit of the series of first bits and a corresponding first bit of the series of second bits).

For example, in the case of performing the first XOR operation on the first data piece DTP11 and the second data piece DTP12 (e.g., DTP11⊕DTP12), "0" may be obtained as the first bit of the intermediate data by performing the XOR operation on "0" being the first bit of the first data piece DTP11 and "0" being the first bit of the second data piece DTP12; "1" may be obtained as the second bit of the intermediate data by performing the XOR operation on "1" being the second bit of the first data piece DTP11 and "0" being the second bit of the second data piece DTP12; "1" may be obtained as the third bit of the intermediate data by performing the XOR operation on "0" being the third bit of the first data piece DTP11 and "1" being the third bit of the second data piece DTP12; and "0" may be obtained as the fourth bit of the intermediate data by performing the XOR operation on "1" being the fourth bit of the first data piece DTP11 and "1" being the fourth bit of the second data piece DTP12.

Figure 6B:
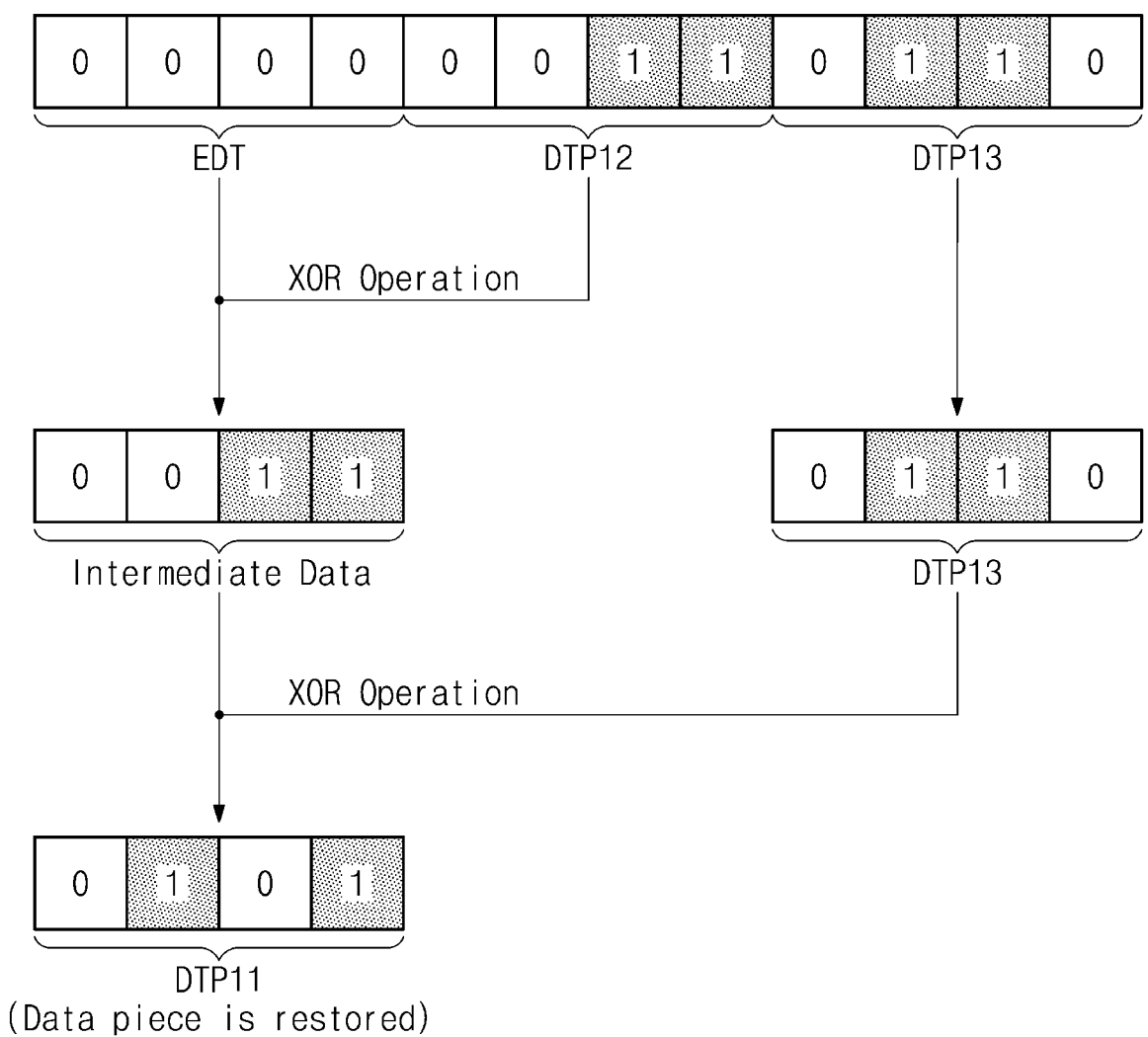

FIG. 6B shows a method of obtaining the first data piece DTP11 based on the XOR operation of the encoded data EDT, the second data piece DTP12, and the third data piece DTP13, and continues the illustrative example discussed with reference to FIG. 6A.

Referring to FIGS. 4 and 6B, the first processor 1111 may receive the encoded data EDT from the logic operation circuit 1223. The encoded data EDT may include a series of bits being "0000". The first processor 1111 may load the second data piece DTP12 and the third data piece DTP13 from the first cache memory 1112. The second data piece DTP12 may include a series of bits being "0011". The third data piece DTP13 may include a series of bits being "0110".

The XOR operator of the first processor 1111 may restore the first data piece DTP11 by performing the XOR operation on the encoded data EDT, the second data piece DTP12, and the third data piece DTP13 with reference to Equation 2 above. The XOR operation of the encoded data EDT, the second data piece DTP12, and the third data piece DTP13 may include a first XOR operation for obtaining intermediate data based on the encoded data EDT and the second data piece DTP12, and a second XOR operation for obtaining the first data piece DTP11 based on the intermediate data and the third data piece DTP13.

The XOR operator of the first processor 1111 may generate the intermediate data by performing the first XOR operation on the encoded data EDT and the second data piece DTP12. The first XOR operation may be performed in units of bit. The intermediate data may include a series of bits being "0011".

Afterwards, the XOR operator of the first processor 1111 may generate the first data piece DTP11 by performing the XOR operation on the intermediate data and the third data piece DTP13. The second XOR operation may be performed in units of bit. The first data piece DTP11 may include a series of bits being "0101". Bit values of the first data piece DTP11 restored in FIG. 6B coincide with bit values of the first data piece DTP11 in FIG. 6A.

The computation process of FIG. 6B may be verified by Equation 5 and Equation 6 above. For example, the encoded data EDT correspond to a result of performing the XOR operation on the first data piece DTP11, the second data piece DTP12, and the third data piece DTP13. According to Equation 5 above, the result of performing the XOR operation on the first data piece DTP11, the second data piece DTP12, and the third data piece DTP13 is identical to a result of performing the XOR operation on the first data piece DTP11, the third data piece DTP13, and the second data piece DTP12.

The intermediate data obtained through the first XOR operation of FIG. 6B are identical to the result of performing the XOR operation on the first data piece DTP11, the third data piece DTP13, the second data piece DTP12, and the second data piece DTP12. According to Equation 6 above, the intermediate data obtained through the first XOR operation are therefore identical to a result of performing the XOR operation on the first data piece DTP11 and the third data piece DTP13.

The first data piece DTP11 obtained through the second XOR operation of FIG. 6B is identical to a result of performing the XOR operation on the first data piece DTP11, the third data piece DTP13, and the third data piece DTP13. According to Equation 6 above, the first data piece DTP11 obtained through the second XOR operation is identical to the first data piece DTP11 and the first data piece DTP11. That is, the first data piece DTP11 may be accurately restored.

Figure 6C:
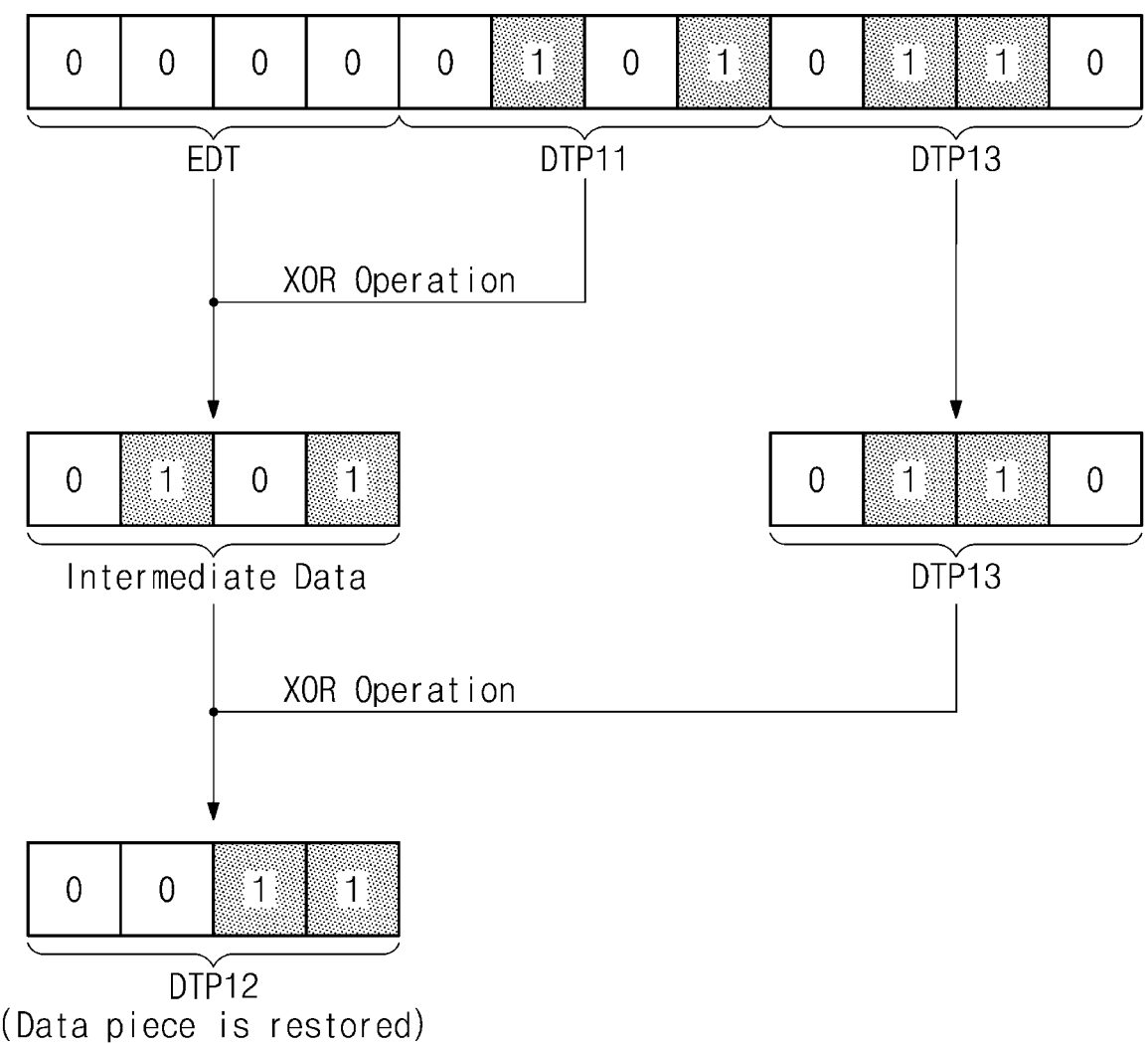

FIG. 6C shows a method of obtaining the second data piece DTP12 based on the XOR operation of the encoded data EDT, the first data piece DTP11, and the third data piece DTP13, and continues the illustrative example discussed with reference to FIG. 6A.

Referring to FIGS. 4 and 6C, the second processor 1121 may receive the encoded data EDT from the logic operation circuit 1223. The encoded data EDT may include a series of bits being "0000". The second processor 1121 may load the first data piece DTP11 and the third data piece DTP13 from the second cache memory 1122. The first data piece DTP11 may include a series of bits being "0101". The third data piece DTP13 may include a series of bits being "0110".

The XOR operator of the second processor 1121 may restore the second data piece DTP12 by performing the XOR operation on the encoded data EDT, the first data piece DTP11, and the third data piece DTP13 with reference to Equation 3 above. The XOR operation of the encoded data EDT, the first data piece DTP11, and the third data piece DTP13 may include a first XOR operation for obtaining intermediate data based on the encoded data EDT and the first data piece DTP11, and a second XOR operation for obtaining the second data piece DTP12 based on the intermediate data and the third data piece DTP13.

The XOR operator of the second processor 1121 may generate the intermediate data by performing the first XOR operation on the encoded data EDT and the first data piece DTP11. The first XOR operation may be performed in units of bit. The intermediate data may include a series of bits being "0101".

Afterwards, the XOR operator of the second processor 1121 may generate the second data piece DTP12 by performing the XOR operation on the intermediate data and the third data piece DTP13. The second XOR operation may be performed in units of bit. The second data piece DTP12 may include a series of bits being "0011". Bit values of the second data piece DTP12 restored in FIG. 6C coincide with bit values of the second data piece DTP12 in FIG. 6A. Likewise, the computation process of FIG. 6C may be verified by Equation 5 and Equation 6 above.

Figure 6D:
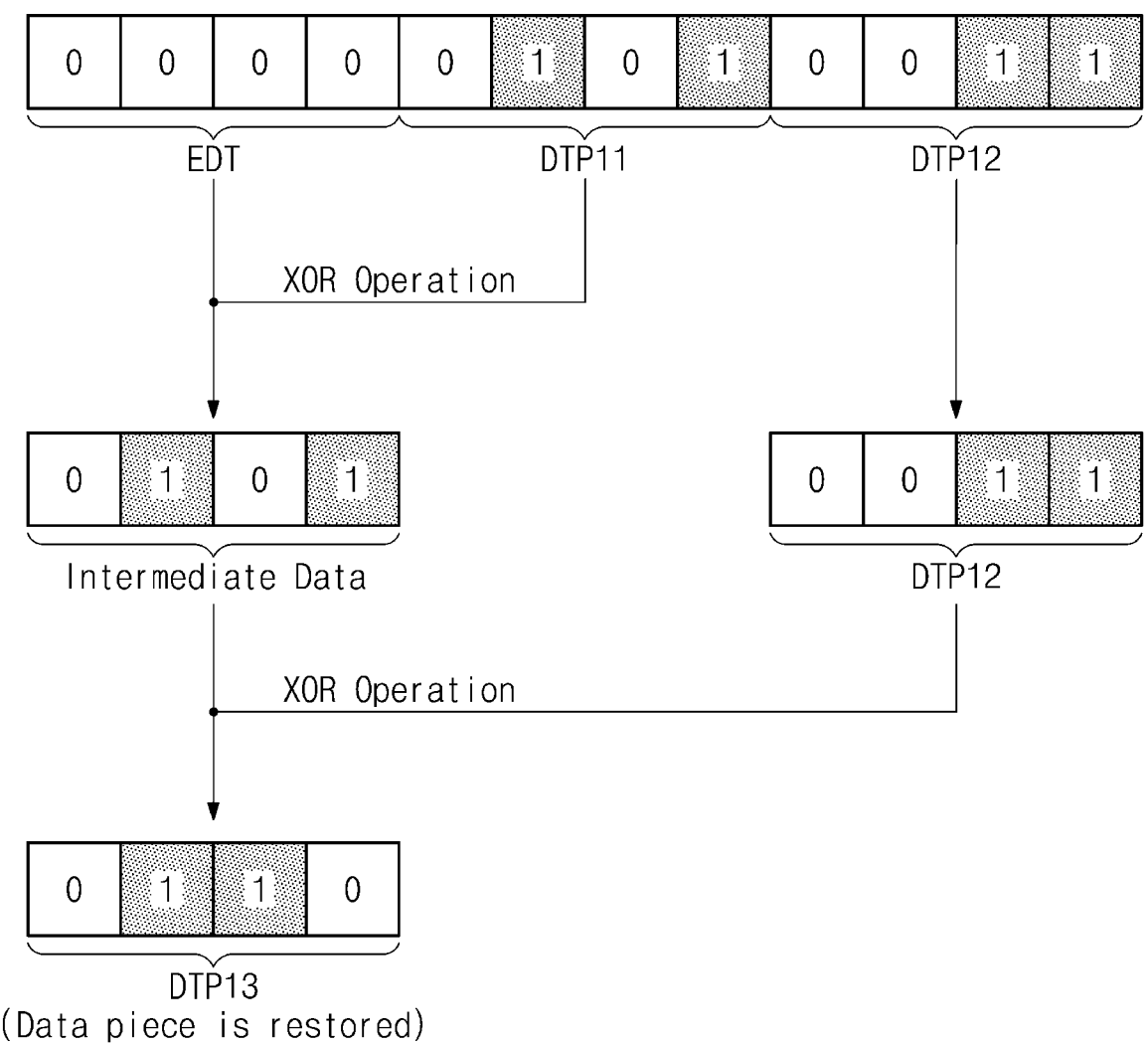

FIG. 6D shows a method of obtaining the third data piece DTP13 based on the XOR operation of the encoded data EDT, the first data piece DTP11, and the second data piece DTP12 and continues the illustrative example discussed with reference to FIG. 6A.

Referring to FIGS. 4 and 6D, the third processor 1131 may receive the encoded data EDT from the logic operation circuit 1223. The encoded data EDT may include a series of bits being "0000". The third processor 1131 may load the first data piece DTP11 and the second data piece DTP12 from the third cache memory 1132. The first data piece DTP11 may include a series of bits being "0101". The second data piece DTP12 may include a series of bits being "0011".

The XOR operator of the third processor 1131 may restore the third data piece DTP13 by performing the XOR operation on the encoded data EDT, the first data piece DTP11, and the second data piece DTP12 with reference to Equation 4 above. The XOR operation of the encoded data EDT, the first data piece DTP11, and the second data piece DTP12 may include a first XOR operation for obtaining intermediate data based on the encoded data EDT and the first data piece DTP11, and a second XOR operation for obtaining the third data piece DTP13 based on the intermediate data and the second data piece DTP12.

The XOR operator of the third processor 1131 may generate the intermediate data by performing the first XOR operation on the encoded data EDT and the first data piece DTP11. The first XOR operation may be performed in units of bit. The intermediate data may include a series of bits being "0101".

Afterwards, the XOR operator of the third processor 1131 may generate the third data piece DTP13 by performing the XOR operation on the intermediate data and the second data piece DTP12. The second XOR operation may be performed in units of bit. The third data piece DTP13 may include a series of bits being "0110". Bit values of the third data piece DTP13 restored in FIG. 6D coincide with bit values of the third data piece DTP13 in FIG. 6A. Likewise, the computation process of FIG. 6D may be verified by Equation 5 and Equation 6 above.

Figure 7:
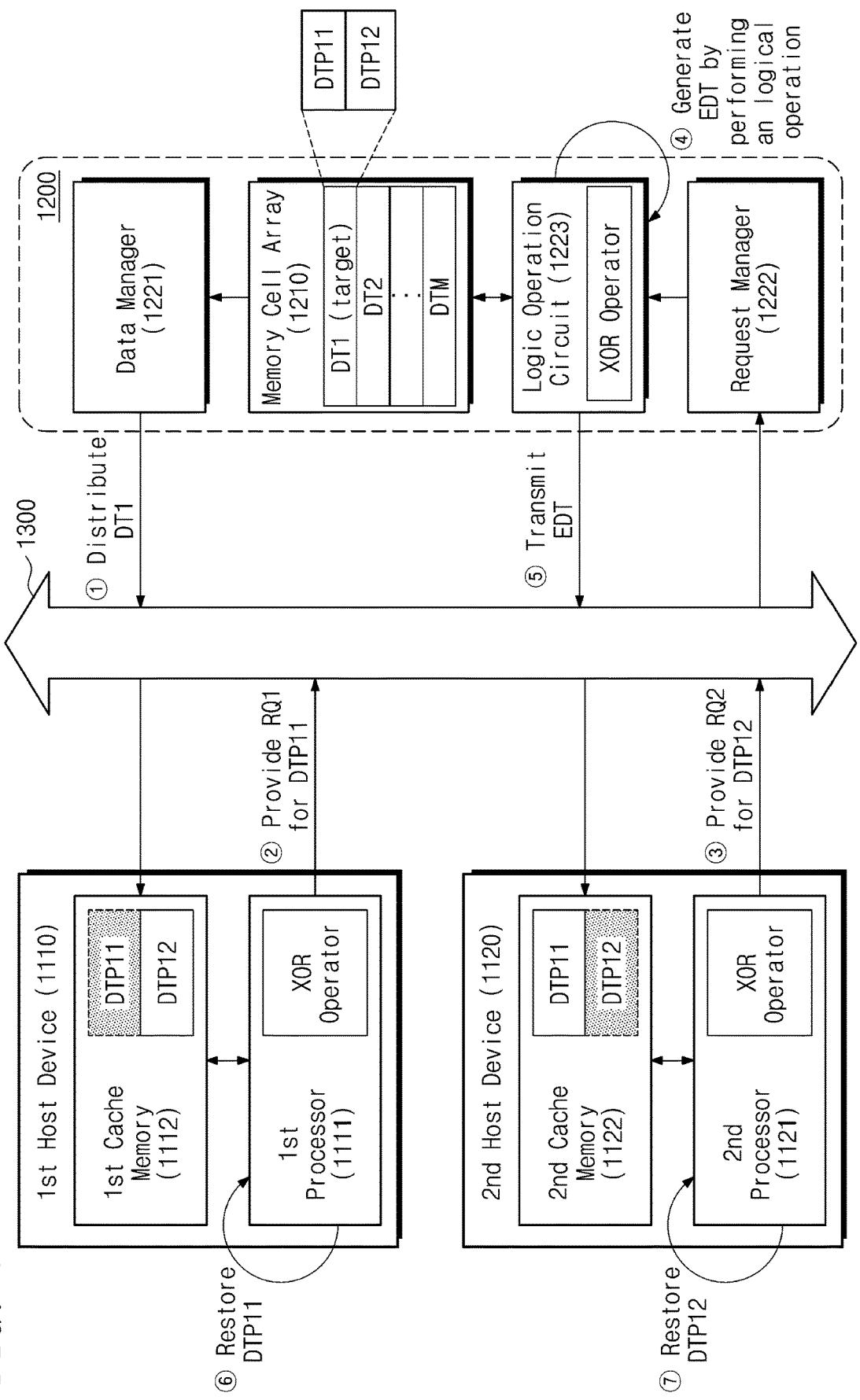
FIG. 7 is a diagram describing a method of operating an electronic device according to some embodiments of the present disclosure.

FIG. 7 is a diagram describing a method of operating an electronic device according to some embodiments of the present disclosure. Referring to FIG. 7, the electronic device 1000 may include the first host device 1110, the second host device 1120, the memory device 1200, and the communication channel 1300.

The first host device 1110 may include the first processor 1111 and the first cache memory 1112. The first processor 1111 may include an XOR operator. The first cache memory 1112 may store the second data piece DTP12 of the first data DT1.

The second host device 1120 may include the second processor 1121 and the second cache memory 1122. The second processor 1121 may include an XOR operator. The second cache memory 1122 may store the first data piece DTP11 of the first data DT1.

The memory device 1200 may include the memory cell array 1210, the data manager 1221, the request manager 1222, and the logic operation circuit 1223. The data manager 1221, the request manager 1222, and the logic operation circuit 1223 may be collectively referred to as a "control logic circuit".

The memory cell array 1210 may store the first to M-th data DT1 to DTM. The first data DT1 may be referred to as "target data". The first data DT1 may include the first data piece DTP11 and the second data piece DTP12. For better understanding of the present disclosure, the description will be given as the first data DT1 includes two data pieces. However, the number of data pieces corresponding to the first data DT1 may be more than "2", and the number of host devices into which data pieces are distributed may be more than "2".

The data manager 1221 may distribute the target data of the memory cell array 1210 into a plurality of host devices.

The request manager 1222 may receive requests from the plurality of host devices and may control the logic operation circuit 1223.

Under control of the request manager 1222, the logic operation circuit 1223 may generate the encoded data EDT by performing a logical operation on data pieces and may transmit the encoded data EDT to the plurality of host devices. The logic operation circuit 1223 may include an XOR operator.

The communication channel 1300 may provide an interface between the first host device 1110, the second host device 1120, and the memory device 1200.

Below, the method of operating the electronic device 1000 according to some embodiments of the present disclosure will be described in detail.

In a first operation ①, the data manager 1221 may load the first data DT1 from the memory cell array 1210. The first data DT1 may be target data. The target data may indicate data targeted for the distribution operation or the transmission operation by the memory device 1200. The first data DT1 may include the first data piece DTP11 and the second data piece DTP12. The data manager 1221 may distribute the first data DT1 into the first host device 1110 and the second host device 1120 through the communication channel 1300. For example, the first host device 1110 may store the second data piece DTP12. The second host device 1120 may store the first data piece DTP11.

In some embodiments, the data manager 1221 may provide the target data to the host devices in common. For example, the data manager 1221 may provide the first data DT1 to each of the first and second host devices 1110 and 1120. The first host device 1110 may selectively store the second data piece DTP12 of the first data DT1. The second host device 1120 may selectively store the first data piece DTP11 of the first data DT1.

In some embodiments, the data manager 1221 may add at least one dummy bits to the target data such that the data pieces have the same size. This will be described in greater detail with reference to FIG. 8.

In some embodiments, the data manager 1221 may divide the target data into a plurality of data pieces and may provide the divided data pieces to the host devices. For example, the data manager 1221 may divide the first data DT1 into the first data piece DTP11 and the second data piece DTP12. The data manager 1221 may provide the second data piece DTP12 to the first host device 1110. The data manager 1221 may provide the first data piece DTP11 to the second host device 1120. This will be described in greater detail with reference to FIG. 9.

In some embodiments, after adding at least one dummy bits to the target data, the data manager 1221 may divide the target data into a plurality of data pieces and may provide the divided data pieces to the host devices. This will be described in greater detail with reference to FIG. 10.

In a second operation ②, the first processor 1111 may determine that the first data piece DTP11 is not buffered, with reference to the first cache memory 1112. The first processor 1111 may generate a first request RQ1 for the first data piece DTP11. The first processor 1111 may provide the first request RQ1 to the request manager 1222 through the communication channel 1300. The request manager 1222 may receive the first request RQ1 during the reference time period.

In a third operation ③, the second processor 1121 may determine that the second data piece DTP12 is not buffered, with reference to the second cache memory 1122. The second processor 1121 may generate a second request RQ2 for the second data piece DTP12. The second processor 1121 may provide the second request RQ2 to the request manager 1222 through the communication channel 1300. The request manager 1222 may receive the second request RQ2 during the reference time period. The second and third operations may be performed in any order.

In a fourth operation ④, the request manager 1222 may control the logic operation circuit 1223 based on receiving the first request RQ1 and the second request RQ2 during the reference time period. The logic operation circuit 1223 may load the first data DT1 from the memory cell array 1210 under control of the request manager 1222. The logic operation circuit 1223 may generate the encoded data EDT by performing a logical operation on the first data piece DTP11 and the second data piece DTP12. For example, the XOR operator of the logic operation circuit 1223 may generate the encoded data EDT by performing the XOR operation on the first data piece DTP11 and the second data piece DTP12 of the first data DT1. The encoded data EDT may have a value corresponding to a result of the XOR operation. The size of the encoded data EDT may be smaller than the size of the first data DT1.

In a fifth operation ⑤, the logic operation circuit 1223 may transmit the encoded data EDT to the first and second host devices 1110 and 1120 through the communication channel 1300.

In a sixth operation ⑥, the first processor 1111 may receive the encoded data EDT from the logic operation circuit 1223. The first processor 1111 may load the second data piece DTP12 from the first cache memory 1112. The first processor 1111 may restore the first data piece DTP11 by performing a logical operation on the encoded data EDT and the second data piece DTP12. For example, the first processor 1111 may restore the first data piece DTP11 accurately by performing the XOR operation. The first processor 1111 may store the restored first data piece DTP11 in the first cache memory 1112 or may perform a first computation based on the restored first data piece DTP11.

In a seventh operation 7, the second processor 1121 may receive the encoded data EDT from the logic operation circuit 1223. The second processor 1121 may load the first data piece DTP11 from the second cache memory 1122. The second processor 1121 may restore the second data piece DTP12 by performing a logical operation on the encoded data EDT and the first data piece DTP11. For example, the second processor 1121 may accurately restore the second data piece DTP12 by performing the XOR operation. The second processor 1121 may store the restored second data piece DTP12 in the second cache memory 1122 or may perform a second computation based on the restored second data piece DTP12. The sixth and seventh operation may be performed in any order.

Figure 8:
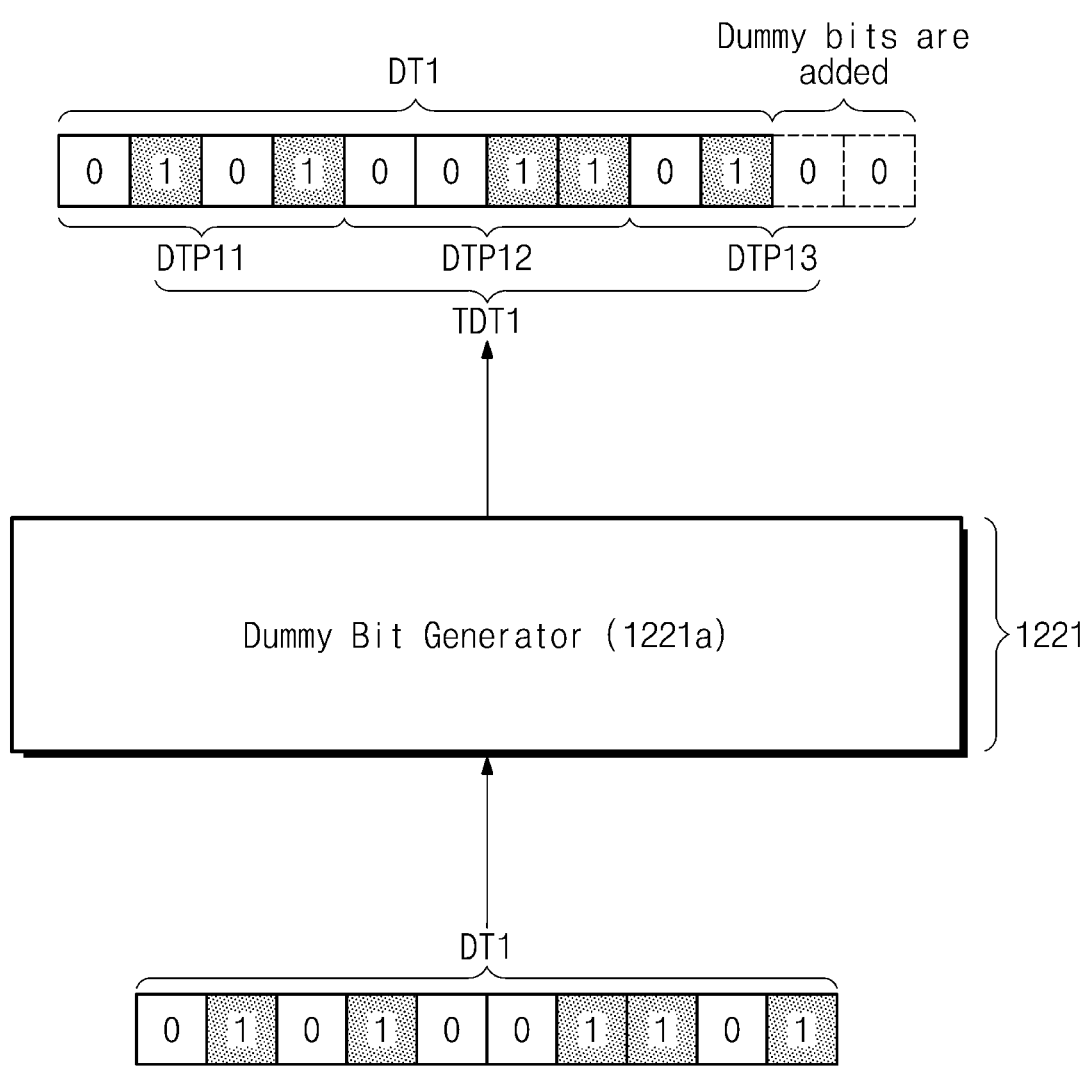
FIG. 8 is a diagram illustrating a data manager according to some embodiments of the present disclosure in detail.

FIG. 8 is a diagram illustrating a data manager according to some embodiments of the present disclosure in greater detail. Referring to FIG. 8, the data manager 1221 may include a dummy bit generator 1221a.

The first data DT1 may be target data. The first data DT1 may be managed by using three data pieces. The size of the first data DT1 may be inappropriate for being managed by using three data pieces. For example, the first data DT1 may include 10 bits; in this case, it may be difficult to divide the 10 bits into three data pieces having the same size.

The dummy bit generator 1221a may load the first data DT1 from the memory cell array 1210. The dummy bit generator 1221a may generate first data TDT1 (hereinafter referred to as "first translation data TDT1") that may be translated or generated from the first data DT1 by adding at least one dummy bits to the first data DT1. The first translation data TDT1 may be referred to as "translated target data". A dummy bit may have an arbitrary value. For example, a value of the dummy bit may be "0". The dummy bit generator 1221a may provide the first translation data TDT1 to each of a plurality of host devices. Each of the plurality of host devices may store at least one data piece among data pieces of the first translation data TDT1.

For example, the dummy bit generator 1221a may load the first data DT1 including 10 bits. The dummy bit generator 1221a may generate the first translation data TDT1 by adding two dummy bits to the first data DT1. The first translation data TDT1 may include 12 bits.

The first translation data TDT1 may correspond to a result of merging the first data DT1 and the dummy bits. The first translation data TDT1 may include the first data piece DTP11, the second data piece DTP12, and the third data piece DTP13. The third data piece DTP13 may include at least one dummy bits. The first to third data pieces DTP11, DTP12, and DTP13 may have the same size.

Figure 9:
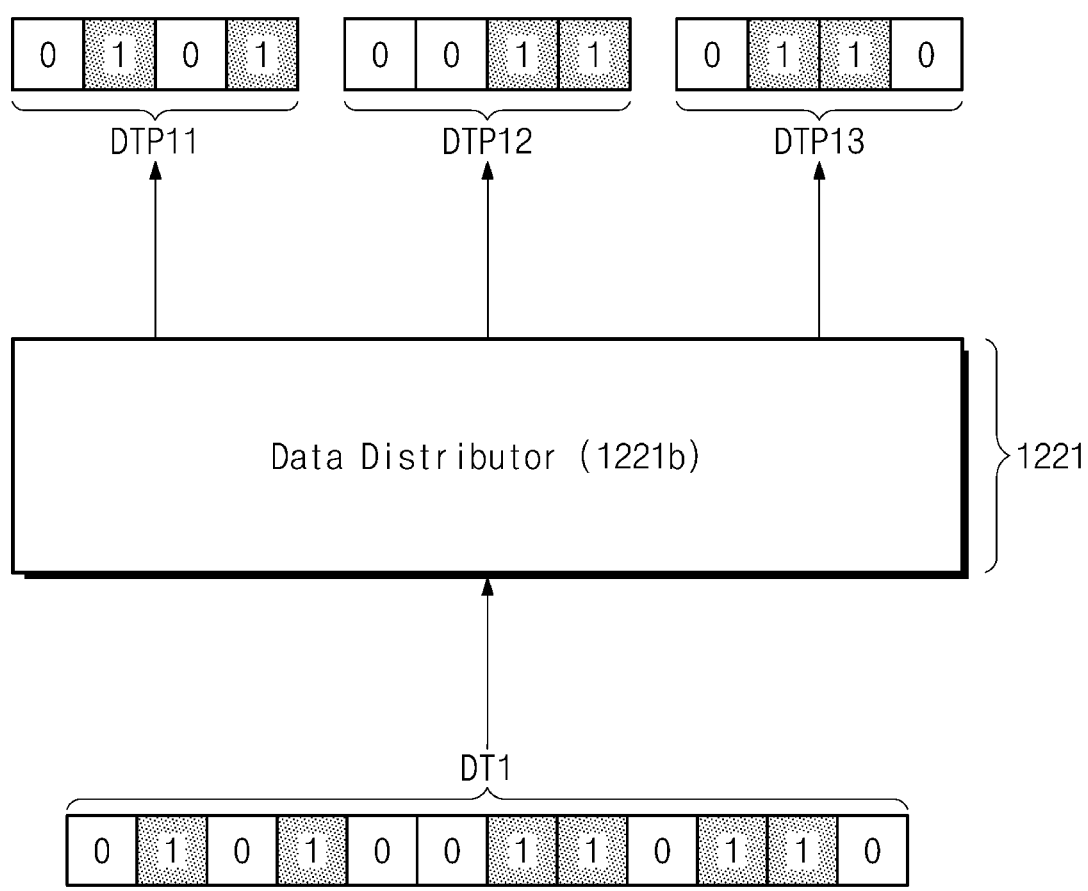
FIG. 9 is a diagram illustrating a data manager according to some embodiments of the present disclosure in detail.

FIG. 9 is a diagram illustrating a data manager according to some embodiments of the present disclosure in greater detail. Referring to FIG. 9, the data manager 1221 may include a data distributor 1221b.

The first data DT1 may be target data. The first data DT1 may be managed by using three data pieces. The size of the first data DT1 may be appropriate for being managed by using three data pieces. For example, the first data DT1 may include 12 bits; in this case, the 12 bits may be divided into three data pieces having the same size (e.g., data pieces each including 4 bits).

The data distributor 1221b may load the first data DT1 from a memory cell array. The data distributor 1221b may divide the first data DT1 into the first data piece DTP11, the second data piece DTP12, and the third data piece DTP13.

The first to third data pieces DTP11, DTP12, and DTP13 may have the same size. The data distributor 1221b may provide a corresponding part of the first to third data pieces DTP11, DTP12, and DTP13 to each of the plurality of host devices.

For example, the data distributor 1221b may provide the second and third data pieces DTP12 and DTP13 to a first host device. The data distributor 1221b may provide the first and third data pieces DTP11 and DTP13 to a second host device. The data distributor 1221b may provide the first and second data pieces DTP11 and DTP12 to a third host device.

Figure 10:
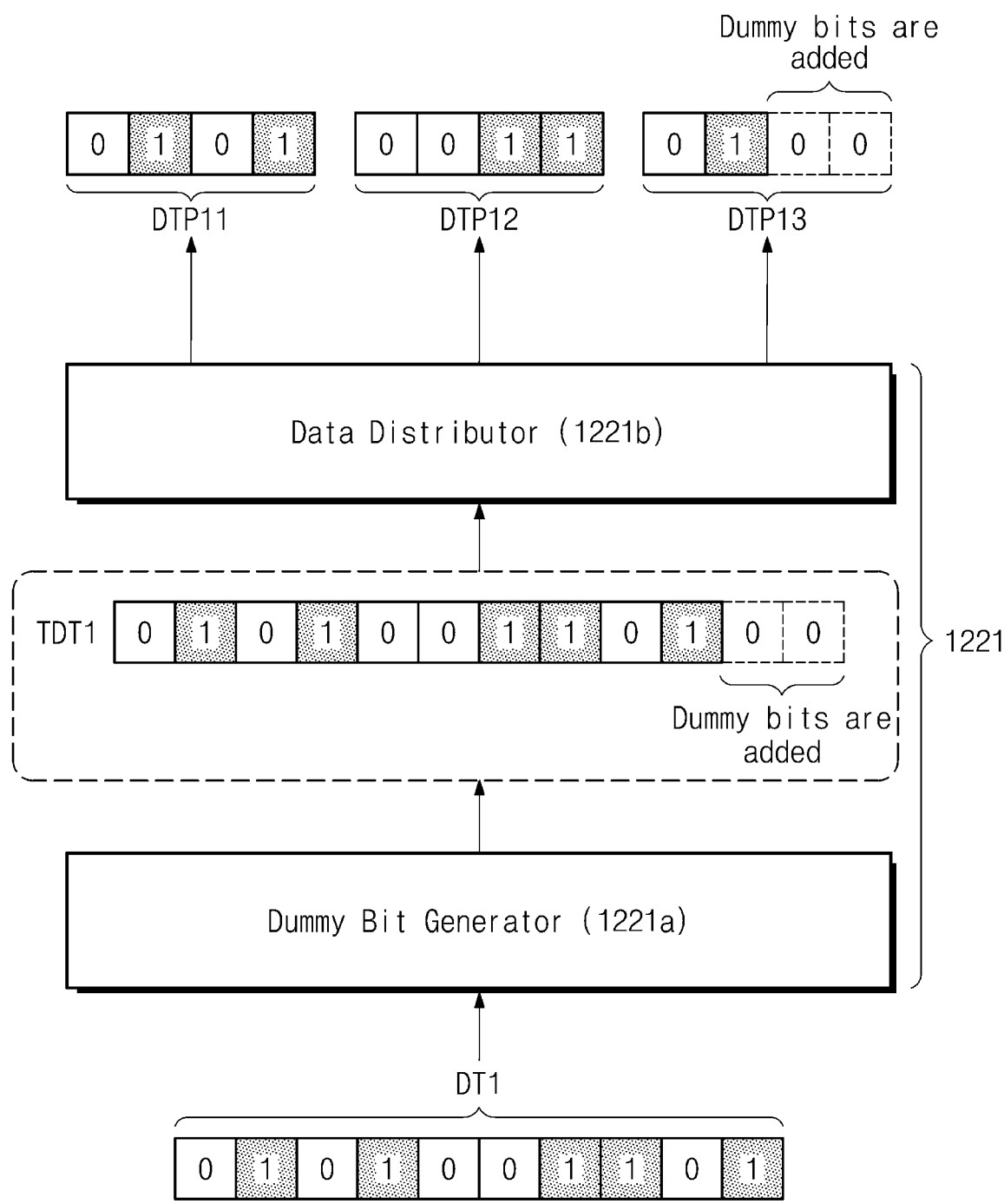
FIG. 10 is a diagram illustrating a data manager according to some embodiments of the present disclosure in detail.

FIG. 10 is a diagram illustrating a data manager according to some embodiments of the present disclosure in greater detail. Referring to FIG. 10, the data manager 1221 may include the dummy bit generator 1221a and the data distributor 1221b.

The first data DT1 may be target data. The first data DT1 may be managed by using three data pieces. The size of the first data DT1 may be inappropriate for being managed by using three data pieces.

The dummy bit generator 1221a may load the first data DT1 from a memory cell array. The dummy bit generator 1221a may generate the first translation data TDT1 by adding at least one dummy bits to the first data DT1. The first translation data TDT1 may be referred to as "translated target data". The dummy bit generator 1221a may provide the first translation data TDT1 to the data distributor 1221b.

The data distributor 1221b may receive the first translation data TDT1 from the dummy bit generator 1221a. The data distributor 1221b may divide the first translation data TDT1 into the first data piece DTP11, the second data piece DTP12, and the third data piece DTP13. The third data piece DTP13 may include at least one dummy bits. The first to third data pieces DTP11. DTP12, and DTP13 may have the same size. The data distributor 1221b may provide a corresponding part of the first to third data pieces DTP11, DTP12, and DTP13 to each of the plurality of host devices.

Figure 11:
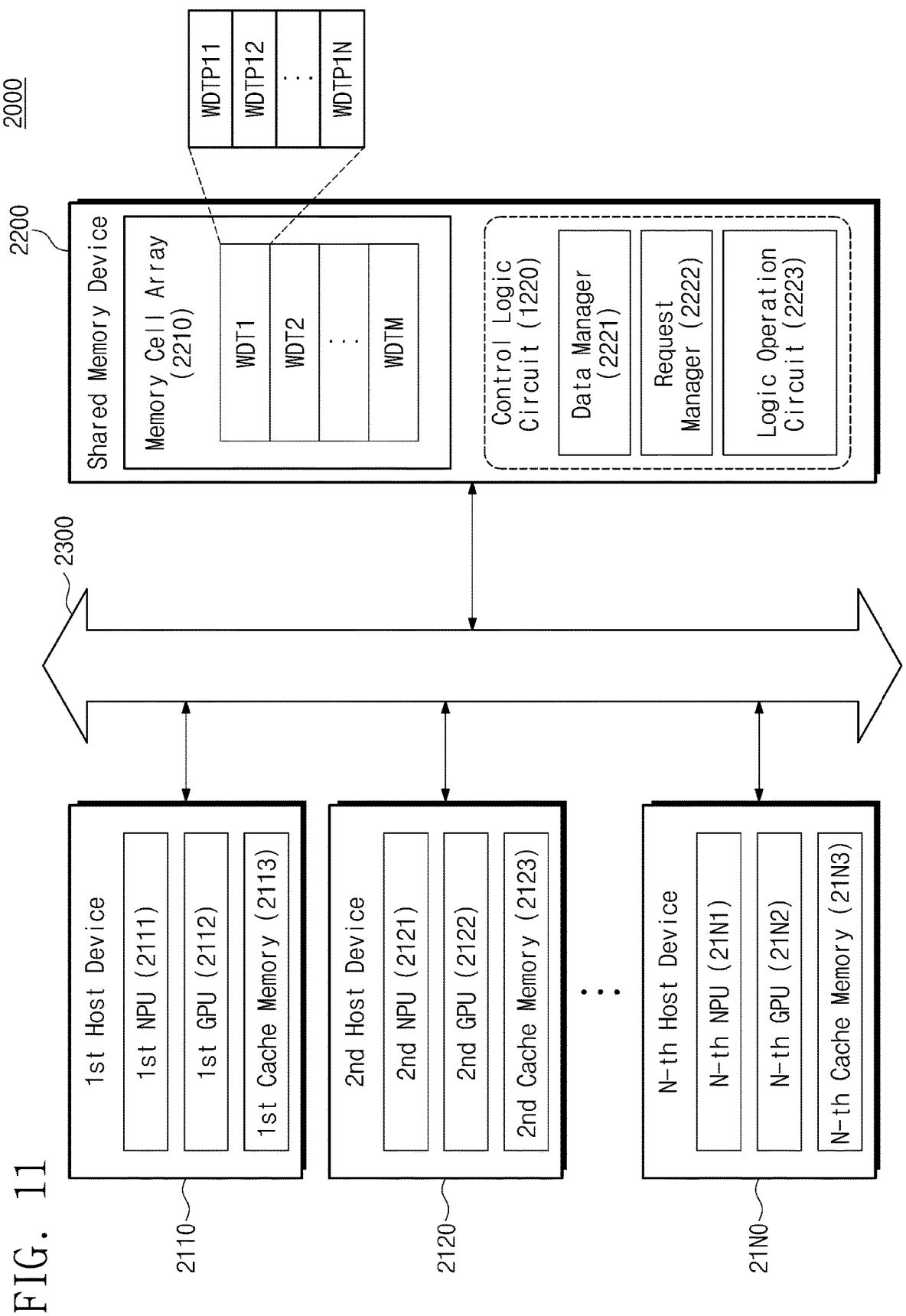
FIG. 11 is a block diagram describing an electronic device according to some embodiments of the present disclosure.

FIG. 11 is a block diagram describing an electronic device according to some embodiments of the present disclosure. Referring to FIG. 11, an electronic device 2000 may include first to N-th host devices 2110 to 21N0, a shared memory device 2200, and a communication channel 2300. The communication channel 2300 may provide an interface between the first to N-th host devices 2110 to 21N0 and the shared memory device 2200.

The first host device 2110 may include a first NPU 2111, a first GPU 2112, and a first cache memory 2113. The first host device 2110 may be specialized for AI or machine learning. The first NPU 2111 may perform a neural network operation. The first GPU 2112 may perform a graphic processing or parallel operation. The first NPU 2111 and the first GPU 2112 may correspond to the first processor 1111 of FIG. 1. The first cache memory 2113 may correspond to the first cache memory 1112 of FIG. 1.

As in the above description of the first host device 2110, the second host device 2120 may include a second NPU 2121, a second GPU 2122, and a second cache memory 2123, and the N-th host device 21N0 may include an N-th NPU 21N1, an N-th GPU 21N2, and an N-th cache memory 21N3.

The shared memory device 2200 may operate as a shared memory for the first to N-th host devices 2110 to 21N0. The shared memory device 2200 may include a memory cell array 2210 and a control logic circuit 2220. The memory cell array 2210 may store first to M-th weight data WDT1 to WDTM. Weight data may be used in the neural network operation and may be referred to as "kernel data" or "filter data". Each of the first to M-th weight data WDT1 to WDTM may include a plurality of weight data pieces. For example, the first weight data WDT1 may include first to N-th weight data pieces WDTP11 to WDTP1N.

The control logic circuit 2220 may include a data manager 2221, a request manager 2222, and a logic operation circuit 2223. The data manager 2221, the request manager 2222, and the logic operation circuit 2223 may respectively correspond to the data manager 1221, the request manager 1222, and the logic operation circuit 1223 of FIG. 1.

In some embodiments, a host device may perform the neural network operation based on a restored data piece. For example, the first cache memory 2113 may store the second to N-th weight data pieces WDTP12 to WDTP1N. The first NPU 2111 may request the first weight data piece WDTP11 from the shared memory device 2200. The logic operation circuit 2223 may generate encoded data based on the XOR operation of the first to N-th weight data pieces WDTP11 to WDTP1N. The logic operation circuit 2223 may provide the encoded data to the first NPU 2111. The first NPU 2111 may restore the first weight data piece WDTP11 by performing the XOR operation on the encoded data and the second to N-th weight data pieces WDTP12 to WDTP1N. The first NPU 2111 may perform the neural network operation based on the restored first weight data piece WDTP11 and the second to N-th weight data pieces WDTP12 to WDTP1N.

Figure 12:
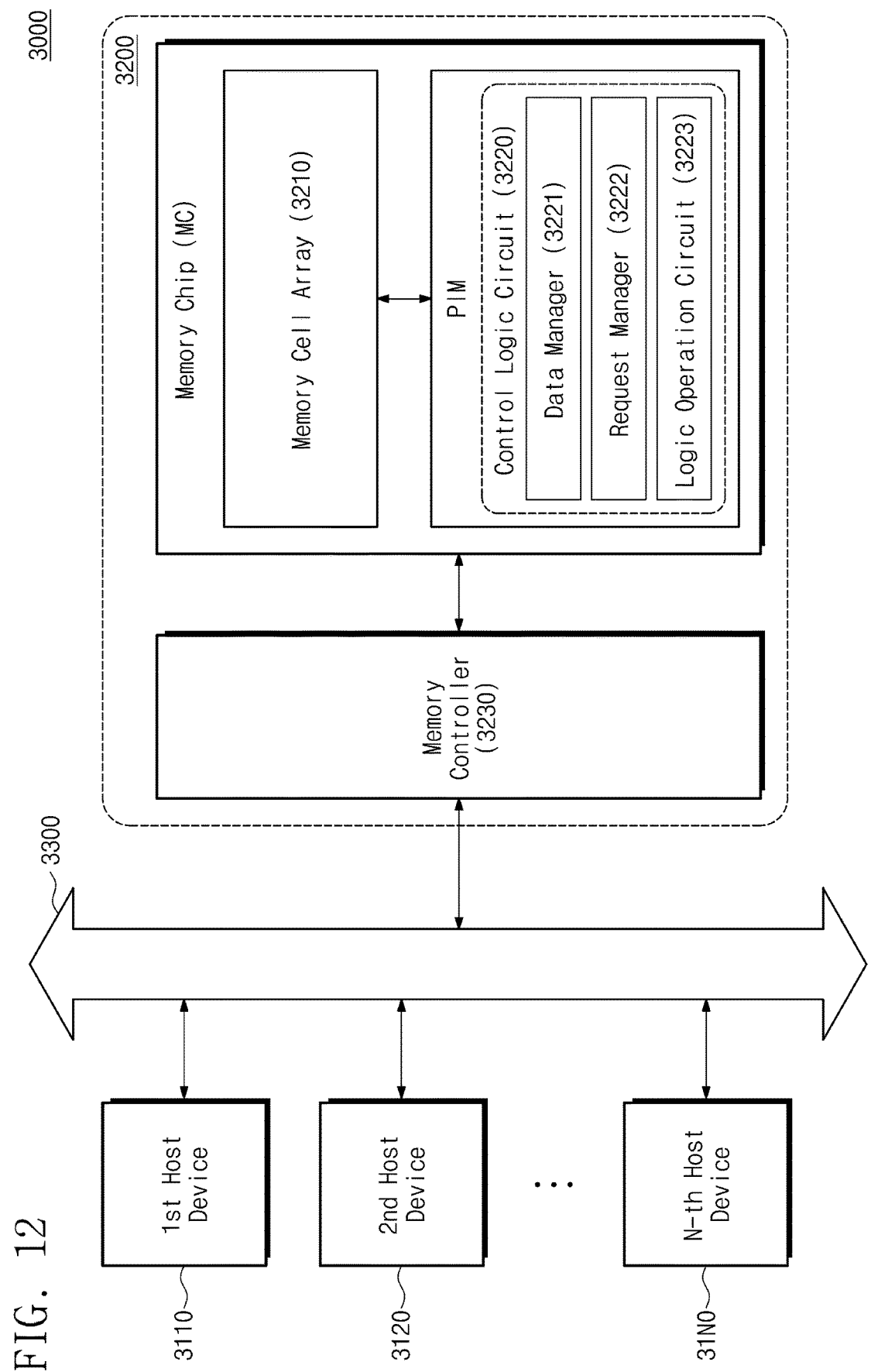
FIG. 12 is a block diagram describing an electronic device according to some embodiments of the present disclosure.

FIG. 12 is a block diagram describing an electronic device according to some embodiments of the present disclosure. Referring to FIG. 12, an electronic device 3000 may include first to N-th host devices 3110 to 31N0, a memory device 3200, and a communication channel 3300. The first to N-th host devices 3110 to 31N0 and the communication channel 3300 may respectively correspond to the first to N-th host devices 1110 to 11N0 and the communication channel 1300 of FIG. 1.

The memory device 3200 may include a memory chip MC and a memory controller 3230. The memory controller 3230 may manage an operation of storing data in the memory chip MC or reading data stored in the memory chip MC.

The memory chip MC may include a memory cell array 3210 and a processing-in-memory (PIM). The PIM may include a control logic circuit 3220. The control logic circuit 3220 may include a data manager 3221, a request manager 3222, and a logic operation circuit 3223. The data manager 3221, the request manager 3222, and the logic operation circuit 3223 may respectively correspond to the data manager 1221, the request manager 1222, and the logic operation circuit 1223 of FIG. 1. That is, the control logic circuit 3220 may be implemented on the PIM in the memory chip MC including the memory cell array 3210.

In some embodiments, unlike the embodiment illustrated in FIG. 12, the control logic circuit 3220 may be distributed and implemented into the memory controller 3230 and the PIM. For example, the data manager 3221 and the request manager 3222 may be implemented on the memory controller 3230 or on a buffer memory communicating with the memory controller 3230. The logical operation circuit 3223 may be implemented on the PIM.

Figure 13:
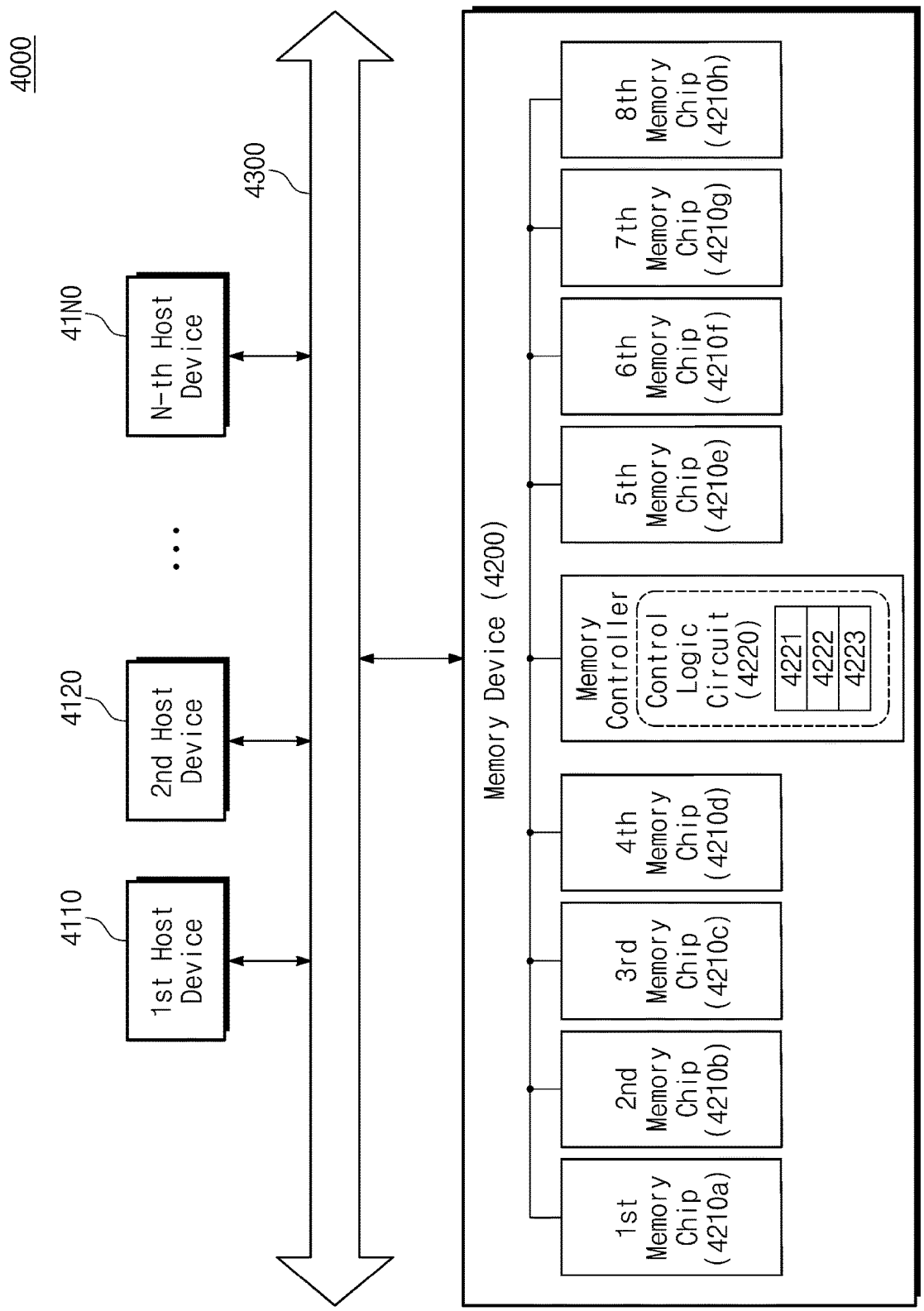
FIG. 13 is a block diagram describing an electronic device according to some embodiments of the present disclosure.

FIG. 13 is a block diagram describing an electronic device according to some embodiments of the present disclosure. Referring to FIG. 13, an electronic device 4000 may include first to N-th host devices 4110 to 41N0, a memory device 4200, and a communication channel 4300. The first to N-th host devices 4110 to 41N0 and the communication channel 4300 may respectively correspond to the first to N-th host devices 1110 to 11N0 and the communication channel 1300 of FIG. 1.

The memory device 4200 may include first to eighth memory chips 4210a, 4210b, 4210c, 4210d, 4210e, 4210f, 4210g, and 4210h and a memory controller. For better understanding of the present disclosure, 8 memory chips will be described, but the number of memory chips in the memory device 4200 may increase or decrease.

Each of the first to eighth memory chips 4210a, 4210b, 4210c, 4210d, 4210e, 4210f, 4210g, and 4210h may include the memory cell array 1210 of FIG. 1.

The memory controller may control the first to eighth memory chips 4210a, 4210b, 4210c, 4210d, 4210e, 4210f, 4210g, and 4210h. The memory controller may include a control logic circuit 4220. The control logic circuit 4220 may include a data manager 4221, a request manager 4222, and a logic operation circuit 4223. The data manager 4221, the request manager 4222, and the logic operation circuit 4223 may respectively correspond to the data manager 1221, the request manager 1222, and the logic operation circuit 1223 of FIG. 1. That is, the control logic circuit 4220 may be implemented on the memory controller controlling a memory chip including a memory cell array.

Figure 14:
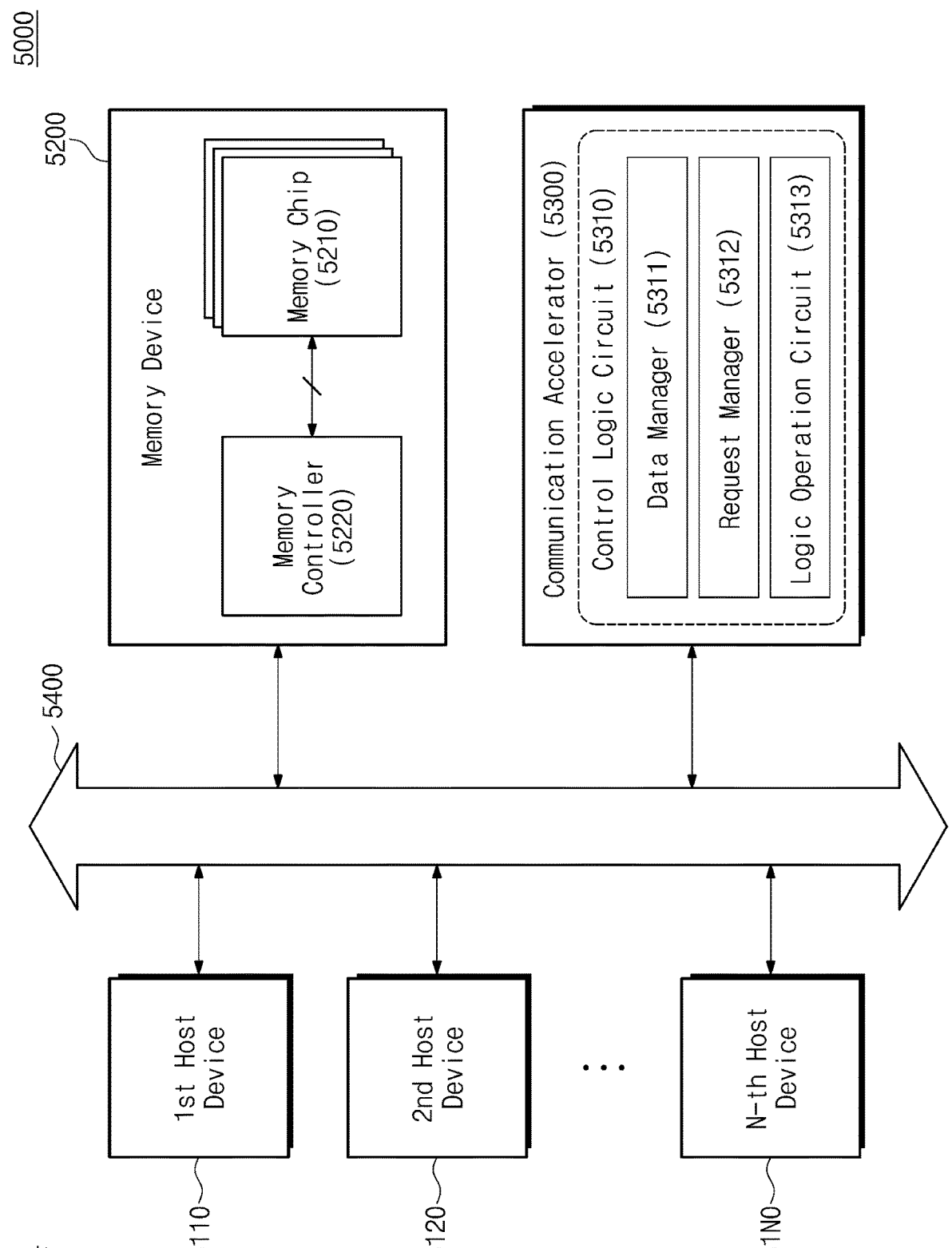
FIG. 14 is a block diagram describing an electronic device according to some embodiments of the present disclosure.

FIG. 14 is a block diagram describing an electronic device according to some embodiments of the present disclosure. Referring to FIG. 14, an electronic device 5000 may include first to N-th host devices 5110 to 51N0, a memory device 5200, a communication accelerator 5300, and a communication channel 5400. The first to N-th host devices 5110 to 51N0 and the communication channel 5400 may respectively correspond to the first to N-th host devices 1110 to 11N0 and the communication channel 1300 of FIG. 1.

The memory device 5200 may include a plurality of memory chips 5210 and a memory controller 5220. Each of the plurality of memory chips 5210 may include the memory cell array 1210 of FIG. 1. The memory controller 5220 may control the plurality of memory chips 5210.

The communication accelerator 5300 may include a control logic circuit 5310. The control logic circuit 5310 may include a data manager 5311, a request manager 5312, and a logic operation circuit 5313. The data manager 5311, the request manager 5312, and the logic operation circuit 5313 may respectively correspond to the data manager 1221, the request manager 1222, and the logic operation circuit 1223 of FIG. 1. That is, the control logic circuit 5310 may be implemented on the communication accelerator 5300 communicating with the memory device 5200 including the memory chips 5310 each including a memory cell array. The control logic circuit 5310 may assist the data communication between the first to N-th host devices 5110 to 51N0 and the memory device 5200 (e.g., the control logic circuit 5310 may perform data piece distribution, request processing, a logical operation, etc.).

Figure 15:
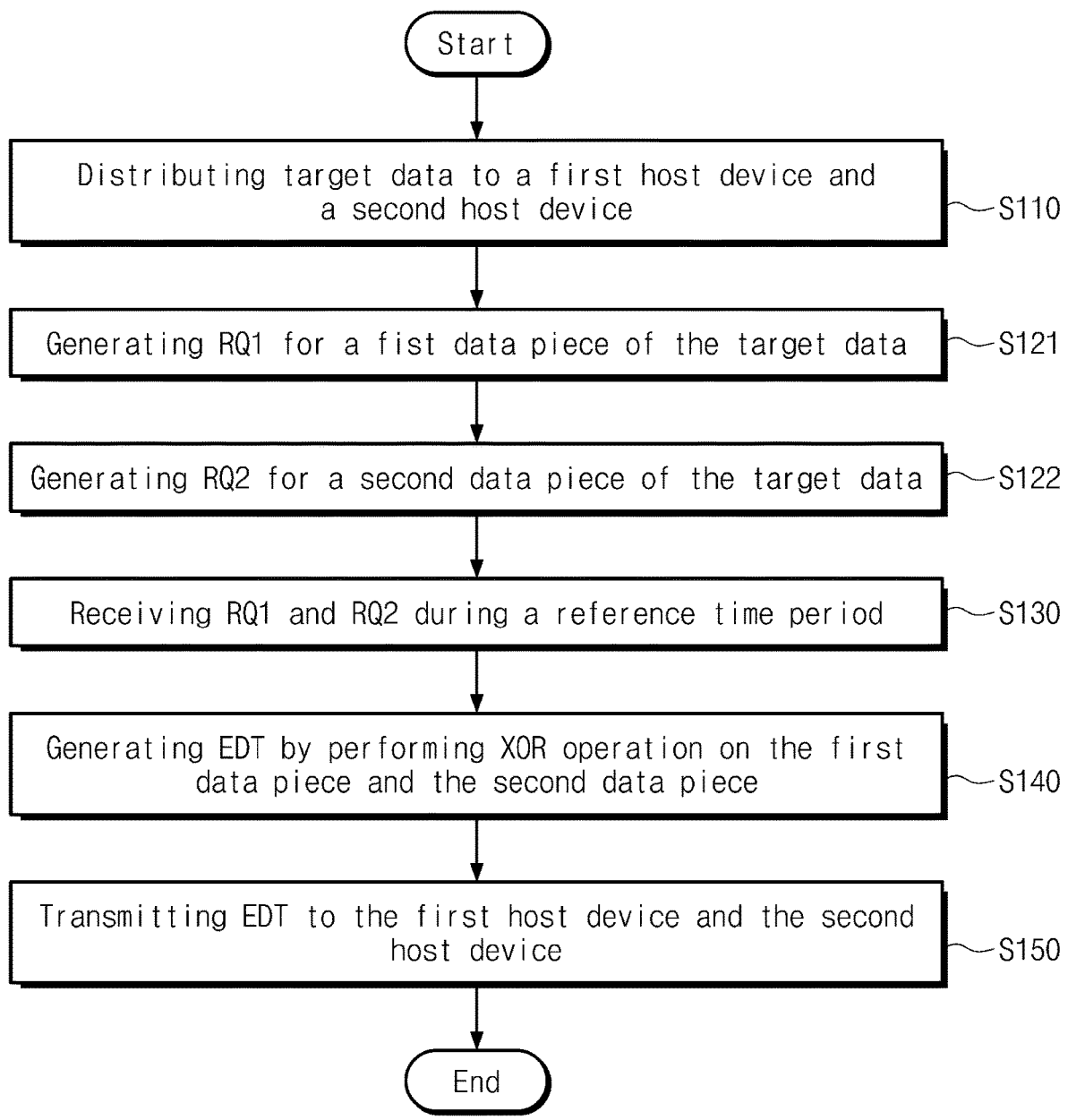
FIG. 15 is a flowchart describing a method of operating an electronic device according to some embodiments of the present disclosure.

FIG. 15 is a flowchart describing a method of operating an electronic device according to some embodiments of the present disclosure. A method of operating an electronic device will be described with reference to FIG. 15. An electronic device may correspond to the electronic device 1000 of FIGS. 1, 3, 4, and 7, the electronic device 2000 of FIG. 11, the electronic device 3000 of FIG. 12, the electronic device 4000 of FIG. 13, and the electronic device 5000 of FIG. 14. The electronic device may include a first host device, a second host device, a control logic circuit, and a memory cell array.

In operation S110, the control logic circuit may distribute target data of the memory cell array into the first host device and the second host device. For example, the target data may include a first data piece and a second data piece. The size of the first data piece may be identical to the size of the second data piece. The first host device may store the second data piece. The second host device may store the first data piece.

In operation S121, the first host device may generate the first request RQ1 for the first data piece of the target data.

In operation S122, the second host device may generate the second request RQ2 for the second data piece of the target data.

In operation S130, the control logic circuit may receive the first request RQ1 and the second request RQ2 during a reference time period.

In operation S140, based on the first request RQ1 and the second request RQ2 received during the reference time period, the control logic circuit may generate the encoded data EDT by performing the XOR operation on the first data piece and the second data piece of the target data in the memory cell array. The encoded data EDT may have a value corresponding to a result of the XOR operation of the first data piece and the second data piece. The size of the encoded data EDT may be smaller than the size of the target data.

In operation S150, the control logic circuit may transmit the encoded data EDT to the first host device and the second host device.

Figure 16:
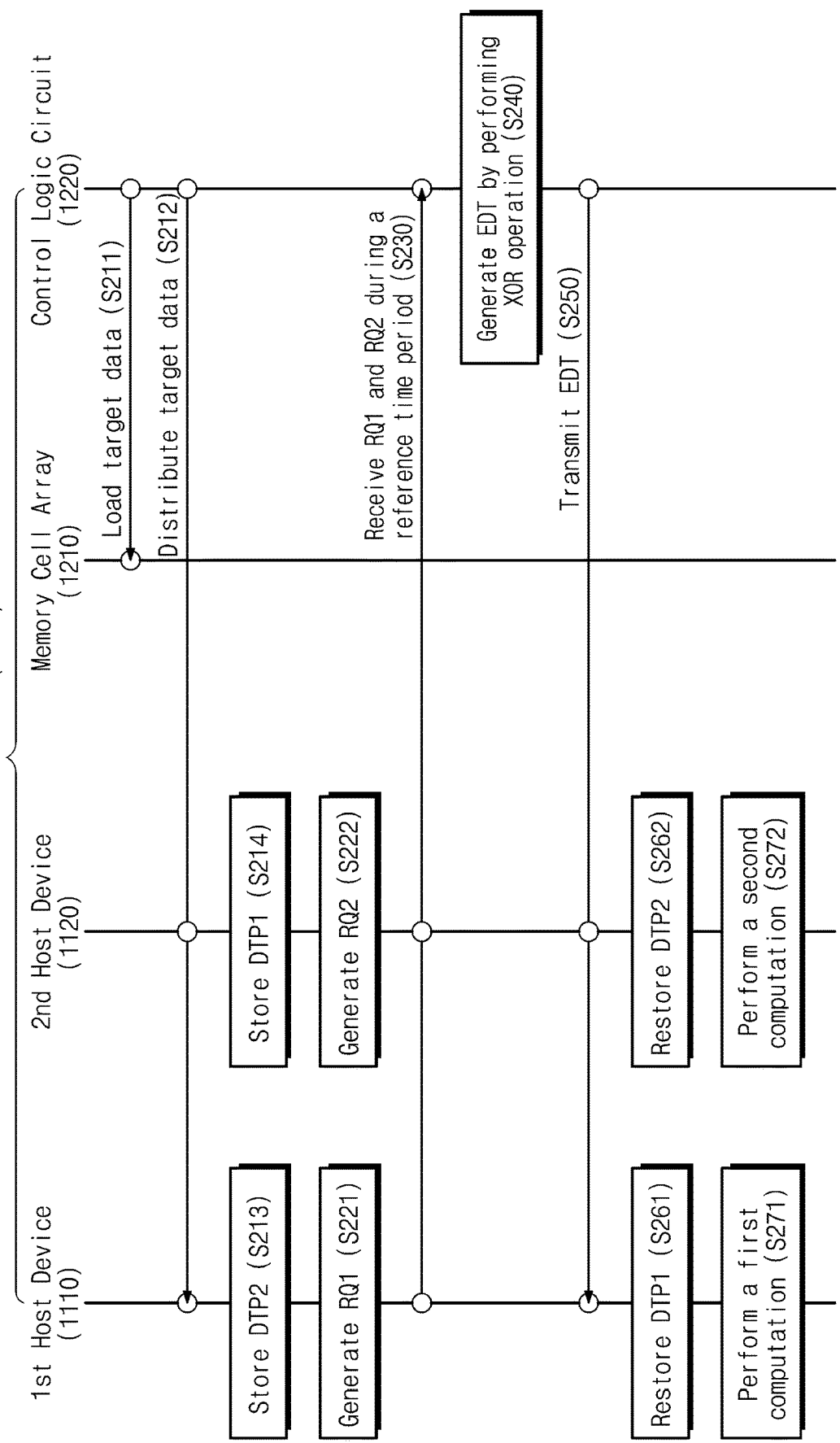
FIG. 16 is a flowchart describing a method of operating an electronic device according to some embodiments of the present disclosure.

FIG. 16 is a flowchart describing a method of operating an electronic device according to some embodiments of the present disclosure. A method of operating the electronic device 1000 will be described with reference to FIG. 16. The electronic device 1000 may correspond to the electronic device 1000 of FIGS. 1, 3, 4, and 7, the electronic device 2000 of FIG. 11, the electronic device 3000 of FIG. 12, the electronic device 4000 of FIG. 13, and/or the electronic device 5000 of FIG. 14. The electronic device 1000 may include the first host device 1110, the second host device 1120, the memory cell array 1210, and the control logic circuit 1220.

In operation S211, the control logic circuit 1220 may load target data from the memory cell array 1210. In other words, the control logic circuit 1220 may fetch the target data from the memory cell array 1210. The memory cell array 1210 may provide the control logic circuit 1220 with the target data according to the request from the control logic circuit 1220. The target data may include a first data piece DTP1 and a second data piece DTP2.

In operation S212, the control logic circuit 1220 may distribute the target data into the first host device 1110 and the second host device 1120.

In some embodiments, the control logic circuit 1220 may divide the target data into the first data piece DTP1 and the second data piece DTP2, may provide the second data piece DTP2 to the first host device 1110, and may provide the first data piece DTP1 to the second host device 1120.

In some embodiments, the control logic circuit 1220 may provide the target data to each of the first and second host devices 1110 and 1120, the first host device 1110 may receive selectively the second data piece DTP2 of the target data, and the second host device 1120 may receive selectively the first data piece DTP1 of the target data.

In operation S213, the first host device 1110 may store the second data piece DTP2. In operation S214, the second host device 1120 may store the first data piece DTP1.

In operation S221, the first host device 1110 may generate the first request RQ1 for the first data piece DTP1. In operation S222, the second host device 1120 may generate the second request RQ2 for the second data piece DTP2.

In operation S230, during a reference time period, the control logic circuit 1220 may receive the first request RQ1 from the first host device 1110 and may receive the second request RQ2 from the second host device 1120.

In operation S240, the control logic circuit 1220 may generate the encoded data EDT by performing the XOR operation on the first data piece DTP1 and the second data piece DTP2.

In operation S250, the control logic circuit 1220 may transmit the encoded data EDT to the first host device 1110 and the second host device 1120.

In operation S261, the first host device 1110 may restore the first data piece DTP1 by performing the XOR operation on the encoded data EDT and the second data piece DTP2. In operation S262, the second host device 1120 may restore the second data piece DTP2 by performing the XOR operation on the encoded data EDT and the first data piece DTP1.

In operation S271, the first host device 1110 may perform a first computation based on the first data piece DTP1 restored in operation S261 and the second data piece DTP2 stored in operation S213. For example, the first computation may include the neural network operation.

In operation S272, the second host device 1120 may perform a second computation based on the second data piece DTP2 restored in operation S262 and the first data piece DTP1 stored in operation S214. For example, the second computation may include the neural network operation.

According to some embodiments of the present disclosure, an electronic device transmitting encoded data and a method of operating the same are provided.

Also, an electronic device and a method of operating the same are provided in which a size of data is reduced by performing a logical operation on data pieces such that the use of a bandwidth of a communication channel may decrease, a communication speed may be improved, and power consumption may be reduced.

While the present disclosure has been described with reference to embodiments thereof, it will be apparent to those of ordinary skill in the art that various changes and modifications may be made thereto without departing from the scope of the present disclosure as set forth in the following claims.

What is claimed is:

1. A method of operating an electronic device which includes a first host device, a second host device, a control logic circuit, and a memory cell array, the method comprising:

distributing, by the control logic circuit, target data of the memory cell array into the first and the second host devices, wherein the target data include a first data piece and a second data piece;

generating, by the first host device, a first request for the first data piece;

generating, by the second host device, a second request for the second data piece;

receiving, by the control logic circuit, the first request and the second request during a reference time period;

generating, by the control logic circuit, encoded data by performing a first exclusive OR (XOR) operation on the first data piece and the second data piece of the target data in the memory cell array, based on the first and the second requests; and transmitting, by the control logic circuit, the encoded data to the first and the second host devices.

2. The method of claim 1, wherein the distributing of the target data of the memory cell array into the first and the second host devices by the control logic circuit includes:
providing, by the control logic circuit, the target data of the memory cell array to each of the first and the second host devices;
storing, by the first host device, the second data piece of the target data; and
storing, by the second host device, the first data piece of the target data.

3. The method of claim 2, further comprising:
restoring, by the first host device, the first data piece by performing a second XOR operation on the encoded data and the second data piece stored by the first host device; and
restoring, by the second host device, the second data piece by performing a third XOR operation on the encoded data and the first data piece stored by the second host device.

4. The method of claim 2, wherein the providing of the target data of the memory cell array to each of the first and the second host devices by the control logic circuit includes:
loading, by the control logic circuit, the target data from the memory cell array;
generating, by the control logic circuit, translated target data by adding at least one dummy bit to the target data; and
providing, by the control logic circuit, the translated target data to each of the first and the second host devices, wherein the second data piece includes the at least one dummy bit, and wherein a size of the first data piece is identical to a size of the second data piece.

5. The method of claim 1, wherein the distributing of the target data of the memory cell array into the first and the second host devices by the control logic circuit includes:
dividing, by the control logic circuit, the target data into the first data piece and the second data piece;
providing, by the control logic circuit, the second data piece to the first host device; and
providing, by the control logic circuit, the first data piece to the second host device.

6. The method of claim 5, wherein the dividing of the target data into the first data piece and the second data piece by the control logic circuit includes:
loading, by the control logic circuit, the target data from the memory cell array;
generating, by the control logic circuit, translated target data by adding at least one dummy bit to the target data; and
dividing, by the control logic circuit, the translated target data into the first data piece and the second data piece, wherein the second data piece includes the at least one dummy bit, and
wherein a size of the first data piece is identical to a size of the second data piece.

7. The method of claim 1, wherein a size of the first data piece is identical to a size of the second data piece.

8. The method of claim 1, wherein the first data piece includes a series of first bits,
wherein the second data piece includes a series of second bits, and
wherein the first XOR operation includes a series of bitwise XOR operations for the series of first bits and the series of second bits.

9. The method of claim 1, wherein a size of the encoded data is smaller than a size of the target data.

10. The method of claim 1, wherein the electronic device further includes a third host device, wherein the target data further includes a third data piece, wherein the method further comprises:
distributing, by the control logic circuit, the target data of the memory cell array into the third host device; and
generating, by the third host device, a third request for the third data piece, wherein the generating of the encoded data by performing the first XOR operation on the first data piece and the second data piece of the target data in the memory cell array based on the first and the second requests by the control logic circuit includes:
generating, by the control logic circuit, the encoded data by performing the first XOR operation on the first data piece, the second data piece, and the third data piece of the target data in the memory cell array, based on the first to the third requests, and wherein the transmitting of the encoded data to the first and the second host devices by the control logic circuit includes:
transmitting, by the control logic circuit, the encoded data to the first to the third host devices.

11. The method of claim 1, further comprising:
restoring, by the first host device, the first data piece by performing a second XOR operation on the encoded data and the second data piece; and
performing, by the first host device, a neural network operation based on the restored first data piece and the second data piece, wherein the memory cell array operates as a shared memory for the first and the second host devices.

12. The method of claim 1, wherein the control logic circuit is implemented:
on a processing-in-memory (PIM) in a first memory chip including the memory cell array,
on a memory controller controlling a second memory chip including the memory cell array, or
on a communication accelerator communicating with a memory device including the memory cell array.

13. A method of operating an electronic device which includes a first host device, a second host device, a third host device, a control logic circuit, and a memory cell array, the method comprising:
distributing, by the control logic circuit, target data of the memory cell array into the first to the third host devices, wherein the target data include a first data piece, a second data piece, and a third data piece;
generating, by the first host device, a first request for the first data piece;
generating, by the second host device, a second request for the second data piece;
generating, by the third host device, a third request for the third data piece;
receiving, by the control logic circuit, the first, the second, and the third requests during a reference time period;
generating, by the control logic circuit, encoded data by performing a first exclusive OR (XOR) operation on the first data piece, the second data piece, and the third data piece of the target data in the memory cell array, based on the first, the second, and the third requests; and
transmitting, by the control logic circuit, the encoded data to the first, the second, and the third host devices.

14. The method of claim 13, wherein the generating of the encoded data by performing the first XOR operation on the first data piece, the second data piece, and the third data piece of the target data in the memory cell array based on the first, the second, and the third requests by the control logic circuit includes:
   generating, by the control logic circuit, intermediate data by performing an XOR operation on the first data piece and the second data piece; and
   generating, by the control logic circuit, the encoded data by performing an XOR operation on the intermediate data and the third data piece.

15. The method of claim 13, wherein the distributing of the target data of the memory cell array into the first, the second, and the third host devices by the control logic circuit includes:
   providing, by the control logic circuit, the target data of the memory cell array to each of the first, the second, and the third host devices;
   storing, by the first host device, the second data piece and the third data piece of the target data;
   storing, by the second host device, the first data piece and the third data piece of the target data; and
   storing, by the third host device, the first data piece and the second data piece of the target data.

16. The method of claim 15, further comprising:
   restoring, by the first host device, the first data piece by performing an XOR operation on the encoded data, the stored second data piece, and the stored third data piece;
   restoring, by the second host device, the second data piece by performing an XOR operation on the encoded data, the stored first data piece, and the stored third data piece; and
   restoring, by the third host device, the third data piece by performing an XOR operation on the encoded data, the stored first data piece, and the stored second data piece.

17. The method of claim 13, wherein the distributing of the target data of the memory cell array into the first, the second, and the third host devices by the control logic circuit includes:
   dividing, by the control logic circuit, the target data into the first data piece, the second data piece, and the third data piece;
   providing, by the control logic circuit, the second data piece and the third data piece to the first host device;
   providing, by the control logic circuit, the first data piece and the third data piece to the second host device; and
   providing, by the control logic circuit, the first data piece and the second data piece to the third host device.

18. An electronic device comprising:
   a memory cell array configured to store target data including a first data piece and a second data piece;
   a first host device configured to store the second data piece and to generate a first request for the first data piece;
   a second host device configured to store the first data piece and to generate a second request for the second data piece; and
   a control logic circuit, wherein the control logic circuit is configured to:
   distribute the target data of the memory cell array into the first and the second host devices;
   receive the first request and the second request during a reference time period;
   generate encoded data by performing an exclusive OR (XOR) operation on the first data piece and the second data piece of the target data in the memory cell array, based on the first request and the second request; and
   transmit the encoded data to the first and the second host devices.

19. The electronic device of claim 18, wherein the control logic circuit includes:
   a data manager configured to distribute the target data of the memory cell array into the first and the second host devices;
   a request manager configured to receive the first request and the second request during the reference time period; and
   a logic operation circuit, wherein, under control of the request manager, the logic operation circuit is configured to:
   load the target data from the memory cell array;
   generate the encoded data by performing the XOR operation on the first data piece and the second data piece of the loaded target data; and
   transmit the encoded data to the first and the second host devices.

20. The electronic device of claim 18, wherein the control logic circuit is implemented:
   on a processing-in-memory (PIM) in a first memory chip including the memory cell array,
   on a memory controller controlling a second memory chip including the memory cell array, or
   on a communication accelerator communicating with a memory device including the memory cell array.

* * * * *